(12) United States Patent
Paulchamy et al.

(10) Patent No.: US 12,039,199 B2
(45) Date of Patent: Jul. 16, 2024

(54) DISCOVERY LOG ENTRY IDENTIFIERS (DLEIDs) APPLICATIONS IN NON-VOLATILE MEMORY EXPRESS® ENVIRONMENTS

(71) Applicant: DELL PRODUCTS L.P., Round Rock, TX (US)

(72) Inventors: Sakti Lakshmiy R Paulchamy, Chennai (IN); Balasubramanian Muthukrishnan, Bangalore (IN); Kavitha Govindasami, Chennai (IN); Erik Smith, Douglas, MA (US); Pawan Kumar Singal, Milpitas, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 126 days.

(21) Appl. No.: 17/864,328

(22) Filed: Jul. 13, 2022

(65) Prior Publication Data

US 2024/0020057 A1    Jan. 18, 2024

(51) Int. Cl.
*G06F 3/06* (2006.01)

(52) U.S. Cl.
CPC .......... *G06F 3/0659* (2013.01); *G06F 3/0607* (2013.01); *G06F 3/0658* (2013.01); *G06F 3/0679* (2013.01); *G06F 3/0604* (2013.01)

(58) Field of Classification Search
CPC ...... G06F 3/0659; G06F 3/0607; G06F 3/067; G06F 3/0689; G06F 3/0655; G06F 3/0679; G06F 3/0658; G06F 3/0604; G06F 13/4027; H04L 67/1061; H04L 69/16
See application file for complete search history.

(56) References Cited

U.S. PATENT DOCUMENTS

| | | |
|---|---|---|
| 11,442,652 B1 | 9/2022 | Dailey |
| 11,489,723 B2 | 11/2022 | Smith |
| 11,543,966 B1 | 1/2023 | Varghese |
| 11,550,734 B1 | 1/2023 | Matosevich |
| 2018/0074717 A1 | 3/2018 | Olarig |

(Continued)

OTHER PUBLICATIONS

Claudio DeSanti, "Subsystem Driven Zoning with Pull Registration Model," nvm EXPRESS, Feb. 1, 2022. (8pgs).

(Continued)

*Primary Examiner* — Tracy C Chan
(74) *Attorney, Agent, or Firm* — NORTH WEBER & BAUGH LLP

(57) ABSTRACT

Systems and methods utilize discovery log entry identifiers (DLEIDs) to identify individual discovery log page entries (DLPEs) in a discovery log page, for example, to allow a name server to manipulate DLPEs and perform specific operations, including zoning operations. Thus, DLEIDs advantageously reduce data flow and repetitive full discovery log page requests and responses and associated processing times; especially, in scenarios where changes to data are minimal. Further, a DLEID-based get log page command may be used to perform push and pull registrations, e.g., to query a specific set of end devices. Advantageously, this reduces message size or sizes and, thus, the number of messages that need to be exchanged, e.g., during an addition or deletion of end devices, especially in larger environments.

20 Claims, 28 Drawing Sheets

(56) References Cited

U.S. PATENT DOCUMENTS

| | | |
|---|---|---|
| 2018/0074984 A1 | 3/2018 | Olarig |
| 2018/0270119 A1 | 9/2018 | Ballapuram |
| 2019/0042144 A1 | 2/2019 | Peterson |
| 2019/0056886 A1* | 2/2019 | Nagarajan ............. G06F 3/0659 |
| 2020/0136996 A1 | 4/2020 | Li |
| 2020/0409893 A1* | 12/2020 | Puttagunta ............. H04L 69/16 |
| 2021/0124695 A1* | 4/2021 | Jaiswal ................. G06F 3/0632 |
| 2021/0286540 A1* | 9/2021 | Tylik ..................... G06F 3/0659 |
| 2021/0286741 A1 | 9/2021 | Smith |
| 2021/0288878 A1 | 9/2021 | Smith |
| 2021/0289027 A1 | 9/2021 | Smith |
| 2021/0289029 A1 | 9/2021 | Smith |
| 2021/0311899 A1 | 10/2021 | Smith |
| 2021/0391988 A1 | 12/2021 | Bedau |
| 2021/0397351 A1* | 12/2021 | Dhatchinamoorthy ..................... G06F 3/0607 |
| 2022/0027076 A1 | 1/2022 | Reichbach |
| 2022/0030062 A1 | 1/2022 | Jennings |
| 2022/0066799 A1 | 3/2022 | Pinto |
| 2022/0286377 A1 | 9/2022 | Smith |
| 2022/0286508 A1 | 9/2022 | Smith |
| 2023/0035799 A1 | 2/2023 | Desanti |
| 2023/0305700 A1 | 9/2023 | Desanti |
| 2023/0325200 A1 | 10/2023 | Desanti |

OTHER PUBLICATIONS

"NVMe-oF™: Discovery Automation for NVMe® IP-based SANs," SNIA NSF Networking Storage, Nov. 2021. (49pgs).

Notice of Allowance & Fee(s) Due received Dec. 28, 2023, in the related matter, U.S. Appl. No. 17/865,244. (30pgs).

NVM Express TM over Fabrics, Revision 1.1 a, Jul. 12, 2021, [online], [Retrieved Jan. 12, 2024]. Retrieved from Internet <URL: https://nvmexpress.org/wp-content/uploads/NVMe-over-Fabrics-1.1a-2021.07.12-Ratified.pdf.> 2021. (84 pgs).

Office Action received Jan. 24, 2024, in the related matter, U.S. Appl. No. 17/863,277. (15pgs).

Office Action received Nov. 9, 2023, in the related matter, U.S. Appl. No. 17/863,300. (18pgs).

Notice of Allowance and Fee(s) Due, received Apr. 25, 2024, in the related matter, U.S. Appl. No. 17/865,244. (9pgs).

\* cited by examiner

400

```
┌─────────────────────────────────────────────┐
│ IN RESPONSE TO RECEIVING, FROM A QUERYING   │
│ DEVICE, A LOG PAGE IDENTIFIER (LPI) VALUE   │
│ THAT IDENTIFIES THE QUERYING DEVICE,        │
│ WHICH HAS REGISTERED A SET OF DISCOVERY     │─── 405
│ LOG ENTRIES THAT ARE ASSOCIATED WITH A SET  │
│ OF END DEVICES AND THAT HAVE BEEN ASSIGNED  │
│ A DISCOVERY LOG ENTRY IDENTIFIER (DLEID),   │
│ COMMUNICATING A SET OF DLEIDS TO THE        │
│ QUERYING DEVICE                             │
└─────────────────────────────────────────────┘
                      │
                      ▼
┌─────────────────────────────────────────────┐
│ IN RESPONSE TO OBTAINING, FROM THE QUERYING │
│ DEVICE, A REQUEST REGARDING A PARTICULAR    │
│ DLEID AMONG THE SET OF DLEIDs THAT          │
│ IDENTIFIES AN INTERFACE ON ONE DEVICE       │─── 410
│ AMONG THE SET OF END DEVICES, DETERMINING   │
│ A LIST ASSOCIATED WITH END DEVICES THAT ARE │
│ ALLOWED TO COMMUNICATE WITH THE INTERFACE   │
└─────────────────────────────────────────────┘
                      │
                      ▼
┌─────────────────────────────────────────────┐
│ COMMUNICATING THE LIST TO THE QUERYING      │─── 415
│ DEVICE                                      │
└─────────────────────────────────────────────┘
```

FIG. 4

DISCOVERY LOG ENTRY IDENTIFIERS (DLEIDs) APPLICATIONS IN NON-VOLATILE MEMORY EXPRESS® ENVIRONMENTS

CROSS-REFERENCE TO RELATED APPLICATIONS

This patent application is related to co-pending and commonly-owned U.S. patent application Ser. No. 17/865,244, filed on 14 Jul. 2022, entitled "DISCOVERY LOG ENTRY IDENTIFIERS (DLEIDs) FOR DEVICES IN NON-VOLATILE MEMORY EXPRESS™-OVER FABRICS (NVMe-oF™) ENVIRONMENTS," and listing Sakti Lakshmiy R Paulchamy, Balasubramanian Muthukrishnan, Kavitha Govindasami, Erik Smith, and Pawan Kumar Singal as inventors, which patent document is incorporated by reference herein in its entirety and for all purposes.

BACKGROUND

A. Technical Field

The present disclosure relates generally to information handling system. More particularly, the present disclosure relates to registration systems and methods that utilize DLEIDs in communication networks that operate in an NVMe-oF™ environment.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A Centralized Discovery Controllers (CDC), which may be implemented on an information handling system in the network or may be distributed across a number of information handling system in the network, maintains a registry for NVMe® end device discovery information that is provided to end devices, typically, in the form of a discovery log page. A discovery log page response returned by a CDC may contain zero or more discovery log page entries (DLPEs), depending on an active zone database configuration. Each DLPE is identified by a rather lengthy "Entry Key" that comprises values for a number of fields, such as an NVMe® Qualified Name (NQN), Transport Address, Port, PortID, Address family, TSAS, and Transport Requirement. Although the construction of an Entry Key using a combination of these fields allows identifying DLPEs, today, individual entries in a discovery log page are not assigned unique identifiers, thus, leading to several drawbacks. As an example, no entry key-based get log page command (or request) is available mainly due to the limitations of the buffer size of 804 bytes an entry key in a request may occupy. Further, although an NVM subsystem may register a number of DLPEs that represent a number of subsystem interfaces provided by that subsystem, if more than one entry is registered via a single connection, in addition to the size limitation, there exists a limitation on the retrieval of accessible lists of discover log pages that are specific to an individual interface. Furthermore, subsystem-driven zoning uses a combination of the entry key values for zone member definitions; however, due to the manner in which entry keys are specified, using a Fully Qualified Name (e.g., NQN+ Transport Address) to reference a specific DLPE is not possible.

Accordingly, it is highly desirable to overcome the shortcomings of existing systems, including the inability to identify individual DLPEs in a name server to manipulate entries and perform specific operations such as zoning operations.

BRIEF DESCRIPTION OF THE DRAWINGS

References will be made to embodiments of the disclosure, examples of which may be illustrated in the accompanying figures. These figures are intended to be illustrative and not limiting. Although the accompanying disclosure is generally described in the context of these embodiments, it should be understood that it is not intended to limit the scope of the disclosure to these particular embodiments. Items in the figures may not be to scale.

FIG. 4 is a flowchart illustrating a simplified process for using DLEIDs in NVMe-oF™ systems, according to embodiments of the present disclosure.

DETAILED DESCRIPTION OF EMBODIMENTS

Figure 1:
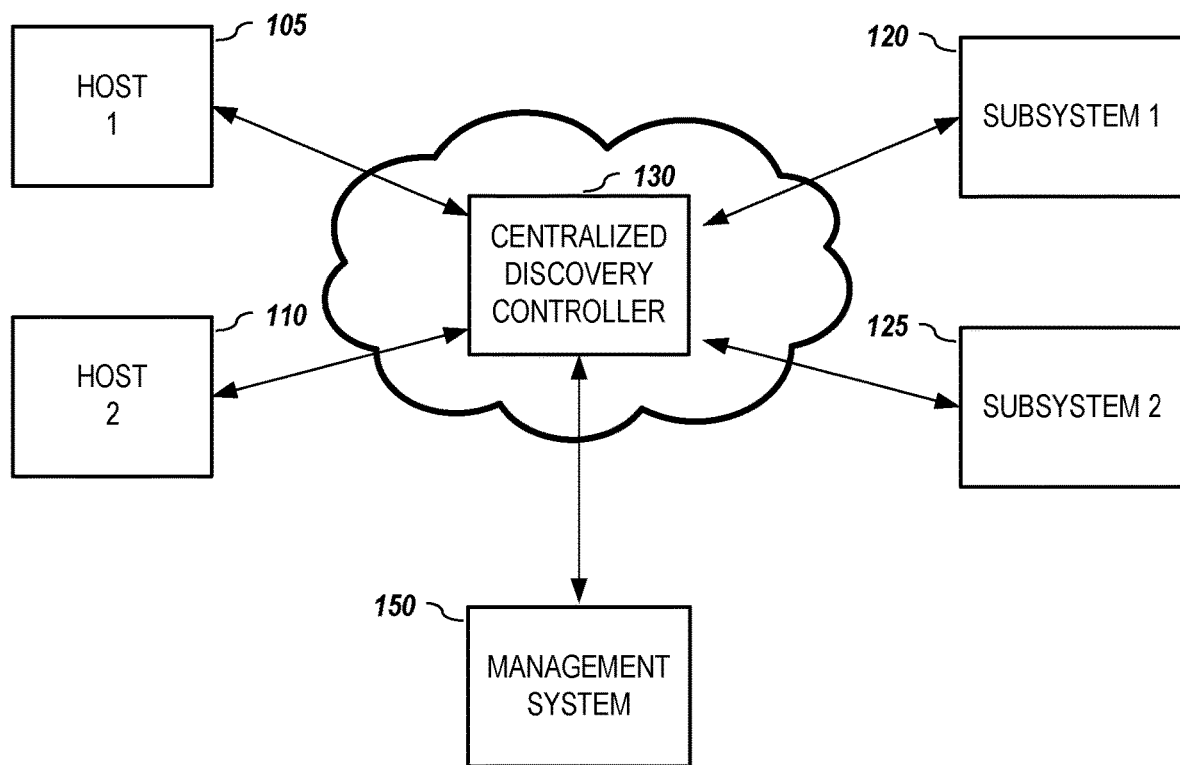
FIG. 1 ("FIG. 1") depicts CDC connections in an exemplary NVMe-oF™ environment, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It is noted that although embodiments described herein may be within the context of NVMe® devices and CDCs, aspects of the present disclosure are not so limited. Accordingly, the aspects of the present disclosure may be applied or adapted for use in other contexts. Each reference/document mentioned in this patent document is incorporated by reference herein in its entirety.

The terms "get log page," and "discovery log," and "discovery log page" may, in certain instances, be used interchangeably. Similarly, the terms "command," "query," and "request" may be used interchangeably. "End device" or "end point device" refers to any fabric interface that has an addressable entity in a transport fabric that provides or consumes a service. The terms "entry," "device," and "interface," in connection with registration, refer to entities that are registered, typically, with a CDC. The terms "DLEIDBr bit" and "brief bit" refer to a DLEID brief bit according to various embodiments herein.

FIG. 1 depicts CDC connections in an exemplary NVMe-oF™ environment, according to embodiments of the present disclosure. In one or more embodiments, CDC 130 may be used to facilitate discovery in network 100. End devices, such as hosts (e.g., 105 and 110) and storage subsystem (e.g., 120 and 125), may register with CDC 130, which information may be used for a number of purposes, such as zoning. In one or more embodiments, a management system 150, which may be controlled by an administrator, may provide an interface to the CDC 130 to allow an admin to perform any of a number of functions, such as, monitor, set policies, perform configurations, define zones, etc. In a system in which an exemplary, e.g., end device 120 that has ten interfaces receives an asynchronous event notification (AEN) from CDC 130, which notifies end device 120 that some change has occurred, and end device 120 sends a get log page command to CDC 130, CDC 130 may return a get log page response that comprises information about all ten interfaces. Thus, the onus of determining the details of the actual changes is on end device 120. In other words, end device has no ability to selectively obtain from CDC 130 information about a discovery log page for a specific entry or interface affected by that change. As a result, the traffic and required processing of the discovery log page responses by end device 120 may consume a great amount of computing resources and time depending, among other things, on the extent of network 100.

Therefore, it would be desirable to have systems and methods that reduce data flow and repetitive full discovery log page requests; especially, in scenarios where changes to data are minimal.

Since in existing systems, once an end device registers more than one interface, DLEs pertaining to a specific interface cannot be retrieved, in one or more embodiments herein, to overcome such limitations, a get log page request that comprises a log page identifier (LPI) may be used to allow an end device to obtain a list of DLEIDs that a CDC has assigned to each entry that has been registered for the end device, including another end device that the end device has registered with the CDC. In one or more embodiments, a CDC, such as CDC 130 in the example in FIG. 1, may include, e.g., in a get log page response, a DLEID that notifies an end device (e.g., end device 120) of changes associated with that DLEID, such that the subsystem may utilize the DLEID to specifically request a get log page associated with that DLEID. Alternatively, CDC 130 may use the DLEID of the subsystem to tailor the get log page response to information associated with the subsystem's DLEID, e.g., by filtering the information from an allowed list associated with the subsystem's DLEID.

As discussed in greater detail below, in one or more embodiments, a get log page response generated by the CDC may comprise a DLEID field in every DLPE. As a result, each end device may query a CDC to learn DLEIDs of those devices that are accessible to the querying device, e.g., based on zoning configuration. In addition, the querying device may use the DLEID of any device that it has registered with the CDC to request a get log page response that comprises information about devices that are accessible to that device, e.g., based on that device's own zoning configuration.

Further, in one or more embodiments, DLEIDs may be used in a get log page query and as Fully Qualified Name, e.g., when performing a manual or subsystem-driven zoning configuration. Advantageously, this may simplify zoning and zone member protocol definitions and, in embodiments, may replace a set of existing zone member types. Furthermore, in one or more embodiments, a DLEID-based get log page command may be used to perform push and pull registrations, e.g., when a specific set of end devices are to be queried. Advantageously, this may reduce messages size and, thus, the number of messages that need to be exchanged, e.g., during the addition or deletion of end devices, especially in larger environments.

In one or more embodiments, the following modifications or additions in frame formats may be made for using DLEIDs in various applications, according to embodiments of the present disclosure. Concerning get log page requests: (1) a new log page identifier for "My DLEIDs" may added; and (2) existing log page identifier, (a) Discovery/Host Discovery may include DLEID with bit set in DLP/HDLP flags, and (b) Host Discovery may be extended to support brief bit to get list of changed Host information when Differential AEN is received. Second, concerning get log page responses: (1) DLEID may be included in Discovery log page entries; (2) AEN may be used with DLEID to notify change in allowed list of mentioned ID; and (3) Differential AEN may be added, which is a new Asynchronous Event Information that may be identified with an identifier (e.g., F2h).

Figure 2:
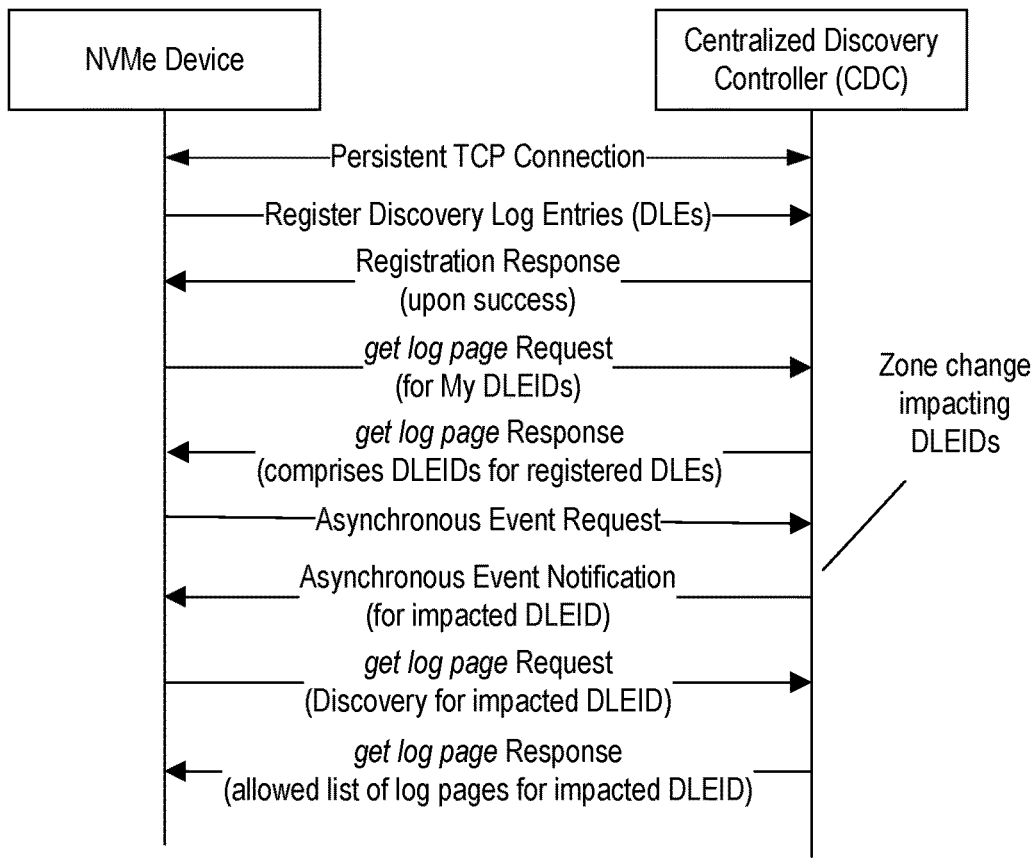
FIG. 2 is a diagram that illustrates an exemplary use of DLEIDs for performing multiple registrations by an end device, according to embodiments of the present disclosure.

FIG. 2 is a diagram that illustrates an exemplary use of DLEIDs for performing a plurality of registrations by an end device, according to embodiments of the present disclosure. The example device in FIG. 2 may be any NVMe® host or an NVM subsystem that forms a persistent connection (e.g., a TCP connection) with a CDC. As depicted, in one or more embodiments, the NVMe® device, in response to forming the connection, may register a set of DLEs with the CDC. The DLEs may identify devices or interfaces of devices in a fabric. Upon successful registration or some later time, the CDC may send to the NVMe® device a confirmation of the registration. Further, the CDC may assign DLEIDs associated with each of the entries, devices, and/or interfaces that have been registered with the CDC.

In one or more embodiments, the NVMe® device may obtain the DLEIDs for the registered entries, e.g., in the form of a list, by sending a get log page command to query the CDC for a list of DLEIDs associated with the DLEs that the querying device has previously registered with the CDC and that have been assigned DLEIDs by the CDC. In one or more embodiments, the CDC may assign, e.g., as part of a registration process, a DLEID to each DLE and maintain the DLEID for each of the entries registered by the NVMe® device.

In one or more embodiments, the get log page request may comprise an LPI value that may be communicated, e.g., in an LPI that indicates the format of the log page and that aids the querying NVMe® device to communicate to the CDC how to interpret the get log page command. In one or more embodiments, the LPI value may comprise a descriptive log page name such as "My DLEIDs" (see Table 1), "My registered DLEIDs," or similar that may be added to a get log page request.

TABLE 1

| Get Log Page - Log Page Identifier (LPI) frame | | |
| --- | --- | --- |
| Log Identifier | Scope | Log Page Name |
| 00h | Controller | Supported Log Pages |
| C0h | | My DLEIDs |

It is understood that specific LPI values may be user-defined, e.g., depending on information the CDC is queried for. In one or more embodiments, an existing frame format may be modified such as to accommodate DLEIDs for various applications.

In one or more embodiments, when the registration of an end device completes, or at other times, the list of Discovery Log Page Entries registered by the host or subsystem may be retrieved using the Get Log Page (Discovery Log) command with this new Log Page Identifier. In one or more embodiments, a response comprises the appropriate Discovery Log Page Entries including DLEIDs for the requesting device's registered entries along with a Discovery log page, an example of which is presented below in Table 2. Consider, by way of illustration, the following embodiments.

In one or more embodiments, the CDC may respond to the get log page request with a get log page response comprising DLEIDs for those DLEs that have been registered by the NVMe® device. The DLEID may identify an interface for which the request seeks to retrieve a list of end devices. A CDC may use the information in the DLEID to filter available data, e.g., according to zoning information that may be returned to the querying device.

In one or more embodiments, the get log page response may comprise a set of discovery log pages, and each discovery log page may comprise a number of discovery log page entries. Table 2 below depicts an exemplary DLPE that comprises a DLEID field, according to embodiments of the present disclosure.

As depicted in Table 2, a DLPE comprises a DLEID field. The DLEID bit may be a 32-bit unique identifier that has been assigned by the CDC for each entry. It is noted that, in one or more embodiments, the CDC may avoid allocating recently removed DLEID to a new entry such as to prevent errors that may result from assigning the same DLEID to two or more devices. In one or more embodiments, the DLPE may include additional field(s). For example, Entry Flags (EFLAGS) bit in Table 2 may comprise additional information related to the current entry. The Transport Service Identifier (TRSVCID) may specify the NVMe® Transport service identifier as an ASCII string. The NVMe® TRSVCID may be specified by the associated NVMe® Transport binding specification. In one or more embodiments, a DLEID field may be added to an existing DLPE in a discovery log page entry. However, this is not intended as a limitation on the scope of the present disclosure, as any known data structure in the art may be used to communicate DLEIDs.

TABLE 2

Get Log Page Response - Discovery Log
Page Entry Comprising DLEID Field

| Bytes | Description |
| --- | --- |
| ... | ... |
| 11:10 | EFLAGS |
| 15:12 | DLEID |
| 31:16 | Reserved |
| 63:32 | TRSVCID |
| ... | ... |

Table 3 below depicts exemplary discovery log page flags (DLPFs), according to embodiments of the present disclosure. This field may be used to indicate additional information related to the Discovery Log page. As shown, a DLEID bit may be set in a DLPF field, for example, to indicate a valid DLEID is included in the request. As shown in Table 3, in one or more embodiments, to allow for key-based or DLEID-based information retrieval, an exemplary get log page request may have a DLEID bit set in a DLPF that may comprise additional information related to a discovery log page. In Table 3, the DLEID bit indicates that a valid DLEID is mentioned in a command DWord (e.g., Command Dword15) for the request. In one or more embodiments, if the DLEID bit is set, the CDC may return a list of DLPEs describing entities that are allowed to communicate with the entity identified by the specified DLEID. An All Subsystems (ALLSUB) bit may be used to return records contained in the log for all NVM subsystem ports. The Port Local (PORTLCL) bit may be set to return port local entries. Further, an extended (EXTEND) bit may be set to return records contained in the log that may include Extended DLPEs.

TABLE 3

Get Log Page Request - Discovery Log Page
Discovery Log Page Flag (DLPF):

| Bits | Description |
| --- | --- |
| 7:4 | Reserved |
| 3 | DLEID |
| 2 | ALLSUB |
| 1 | PORTLCL |
| 0 | EXTEND |

As shown in Table 4, a Discovery Log Entry Identifier (DLEID) value may be provided in a command Dword15 field of a get log page request.

TABLE 4

Get Log Page Request - Command Dword15

| Bytes | Description |
| --- | --- |
| 03:00 | DLEID: Identifier of an interface for which allowed list of one or more end devices are to be retrieved |

Table 5 below depicts a format for a get log page request for a host discovery log page. As depicted, the format comprises a host discovery log page flag (HDLPF) field that comprises information related to the host discovery log page, such as a DLEID Brief (DLEIDBr) bit. In one or more embodiments, a DLEIDBr bit may be used to indicate whether the type of the request is for a "Detail" query or a "Brief" type query. Once the DLEIDBr bit is set, the HDLPF may thus indicate a request for DLEIDs that have recently changed, e.g., over a period of time, or since a prior host discovery log request. A host discovery log page response by the CDC to such a request may comprise a list of DLEIDs that were affected by a recent change. The response may further comprise a corresponding change (CHG) bit that, as discussed with reference to Table 6 below, may identify the type of that change. Conversely, if the DLEIDBr bit is not set in the HDLF (or is set to zero), the response may comprise one or more full log pages.

In one or more embodiments, the HDLPF may further comprise a DLEID bit that indicates a valid DLEID is mentioned in a command Dword (e.g., Command DWORD15). When a DLEID is specified in this manner, the CDC may return a list of host discovery log page entries that identify entities that are allowed to communicate with the entity identified by the DLEID. Further, an All Hosts (ALL-HOST) bit may be present and may be set to request records for all hosts.

As a result of the DLEIDBr bit being set, a host discovery log page response need not be a full host discovery log page response that encompasses all DLEIDs associated with the NVMe® device. Instead, in one or more embodiments, DLEIDs may be used in connection with the get log page request to specify which discovery log pages are to be obtained. Advantageously, this reduces traffic and the computational burden on the system by significantly reducing data flow, the number of repetitive full discovery log page responses, and processing times.

In one or more embodiments, an initial request may return a response indicating all DLEIDs available to a device, and subsequent requests may be differential responses that indicate those devices to the brief setting in Table 5 that have experienced a change when compared to those in the initial request. Further, as discussed below with reference to FIG. 5, a DLEIDBr bit may be used to generate differential AENs that may result in a further traffic reduction.

TABLE 5

Get Log Page Request - Host Discovery Log Page

| Bytes | Description | |
|---|---|---|
| 18 | Host Discovery Log Page Flag (HDLPF): | |
| | Bits | Description |
| | 7:3 | Reserved |
| | 2 | DLEID |
| | 1 | DLEIDBr |
| | 0 | ALLHOST |

Table 6 depicts an exemplary response frame for a host discovery log page response to a host discovery log page request that has a brief bit set, according to embodiments of the present disclosure. The host discovery log page response is a response to a host discovery log page request in which a brief bit (shown in Table 5) was set. The response may comprise a number of DLEIDs that correspond to entries for devices that have experienced a recent status change. In one or more embodiments, the information about the change of a host device may be communicated in a change bit in a CHG field. The type of change, e.g., an addition, deletion, or update, may be indicated in a CHG bit. In the example in Table 6, the value 00h indicates an addition, the value 01h indicates a deletion, and the value 10h indicates in update.

TABLE 6

Host Discovery Log Page Response

| Bytes | Description | |
|---|---|---|
| 03:00 | DLEID: Identifies entries that have been changed, added, or deleted | |
| 07:04 | Bits | Description |
| | 1:0 | CHG - values denote type of change: 00h - add; 01h - delete; 10h - update |
| | 31:2 | Reserved |
| 11:08 | Second DLEID | |
| 15:12 | Change byte for second DLEID & reserved field | |
| $(2^{N+1} + 3):(2^{N+1})$ | $N^{th}$ DLEID | |
| $(2^{N+1} + 3):(2^{N+1})$ | Change byte for $N^{th}$ DLEID | |

Table 7 depicts the use of a DLEID in an AEN, according to embodiments of the present disclosure. In one or more embodiments, a CDC may use a DLEID in an AEN to communicate the presence of zoning changes that may have occurred and that impact a specific entry associated with the DLEID. As a result, in one or more embodiments, the NVMe® device may use a get log page request that includes the DLEID in command DWord15, as previously mentioned, to obtain information specific to the DLEID, thus, reducing overall processing and the number of full discovery log page responses.

TABLE 7

Use of a DLEID in an AEN

| Bytes | Description |
|---|---|
| 03:00 | 0-Event Type as Notice; 1-F0h for information; 2-LPI field; 3rd byte-Reserved |
| 07:04 | DLEID (for which change in discovery log page has occurred) |
| 09:08 | SQHD—Submission Queue Header |
| 15:10 | 11:10-Reserved; 13:12-Command ID; 14:15-Status |

Figure 3:
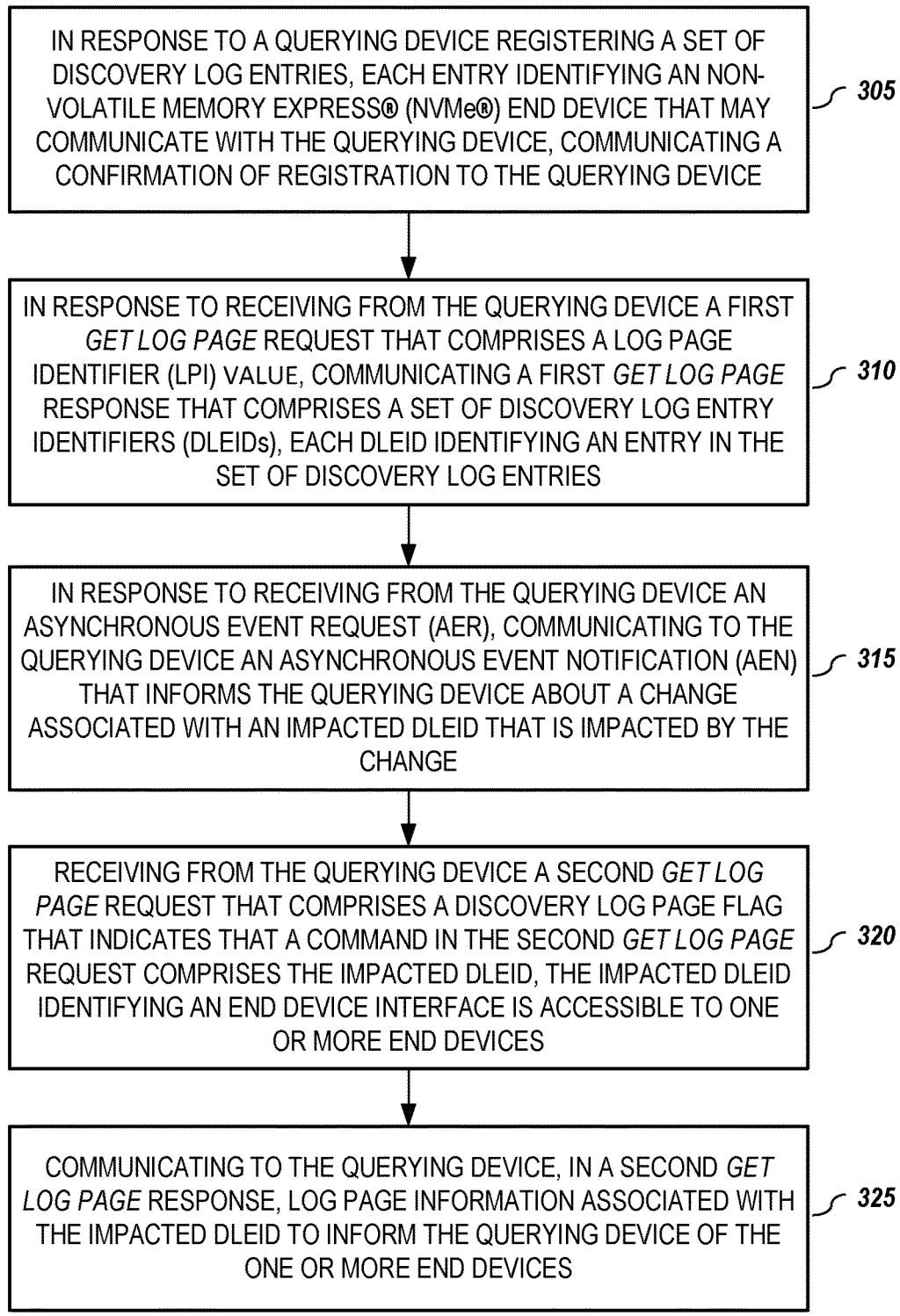
FIG. 3 is a flowchart illustrating a process for using DLEIDs in NVMe-oF™ systems, according to embodiments of the present disclosure.

FIG. 3 is a flowchart illustrating a process for using DLEIDs in NVMe-oF™ systems, according to embodiments of the present disclosure. In one or more embodiments, process 300 may start when, in response to a querying device registering a set of discovery log entries, each entry identifying an NVMe® end device that may communicate with the querying device, a CDC may communicate (305) a confirmation of registration to the querying device. In response to receiving from the querying device a first get log page request that comprises an LPI value, such as MyDLEID, the CDC may communicate (310) a first get log page response to the NVMe® end device. The first get log page response may comprise a set of DLEIDs that each identifies a self-registered set of discovery log entries.

In one or more embodiments, in response to receiving from the querying device an asynchronous event request (AER), the CDC may communicate (315) an asynchronous event notification (AEN), which informs the querying device about a change associated with an impacted DLEID that is impacted by the change. Further, the CDC may receive (320) from the querying device a second get log page request that comprises a discovery log page flag that indicates that a command in the second get log page request comprises the impacted DLEID, e.g., a DLEID that identifies an end device interface that is accessible to one or more end devices. Finally, the CDC may communicate (325) to the querying device, e.g., in a second get log page response, log page information that is associated with the impacted DLEID to inform the querying device of the one or more end devices.

It is noted that: (1) certain steps herein may optionally be performed; (2) steps may not be limited to the specific order set forth herein; (3) certain steps may be performed in different orders; and (4) certain steps may be done concurrently.

FIG. 4 is a flowchart illustrating a simplified process for using DLEIDs in NVMe-oF™ systems, according to embodiments of the present disclosure. In one or more embodiments, process 400 may start when a CDC, in response to receiving from a querying device an LPI that identifies the querying device, which has registered a set of discovery log entries that are associated with a set of end devices and that have been assigned a DLEID, communicates (405) a set of DLEIDs to the querying device. In response to obtaining from the querying device a request regarding a particular DLEID among the set of DLEIDs that identifies an interface on one device among the set of end devices, the CDC may determine (410) and communicate (415) to the querying device a list associated with end devices that are allowed to communicate with the interface.

In subsystem-driven zoning, typically, before a subsystem can allocate storage resources to hosts and permit access to a subsystem's interfaces, the subsystem ascertains from a CDC a full list of hosts that are present on the fabric, e.g., to be able to create and configure zones. The subsystem may send a discovery get log page command to the CDC to query a list of the hosts. Once the subsystem obtains and processes that relatively large list of entries, e.g., to determine which hosts are new, an administrator of the subsystem may then choose hosts to access desired portions of the subsystem. The subsystem may then communicate this information to the CDC such that the CDC can create appropriate zones.

Therefore, in one or more embodiments, instead of the subsystem having to acquire and process a large full host discovery list, a relatively smaller differential response to a host discovery process is utilized that may inform the subsystem of recent changes without providing redundant information. Advantageously, such an approach significantly reduces traffic and saves valuable computing resources.

Figure 5:
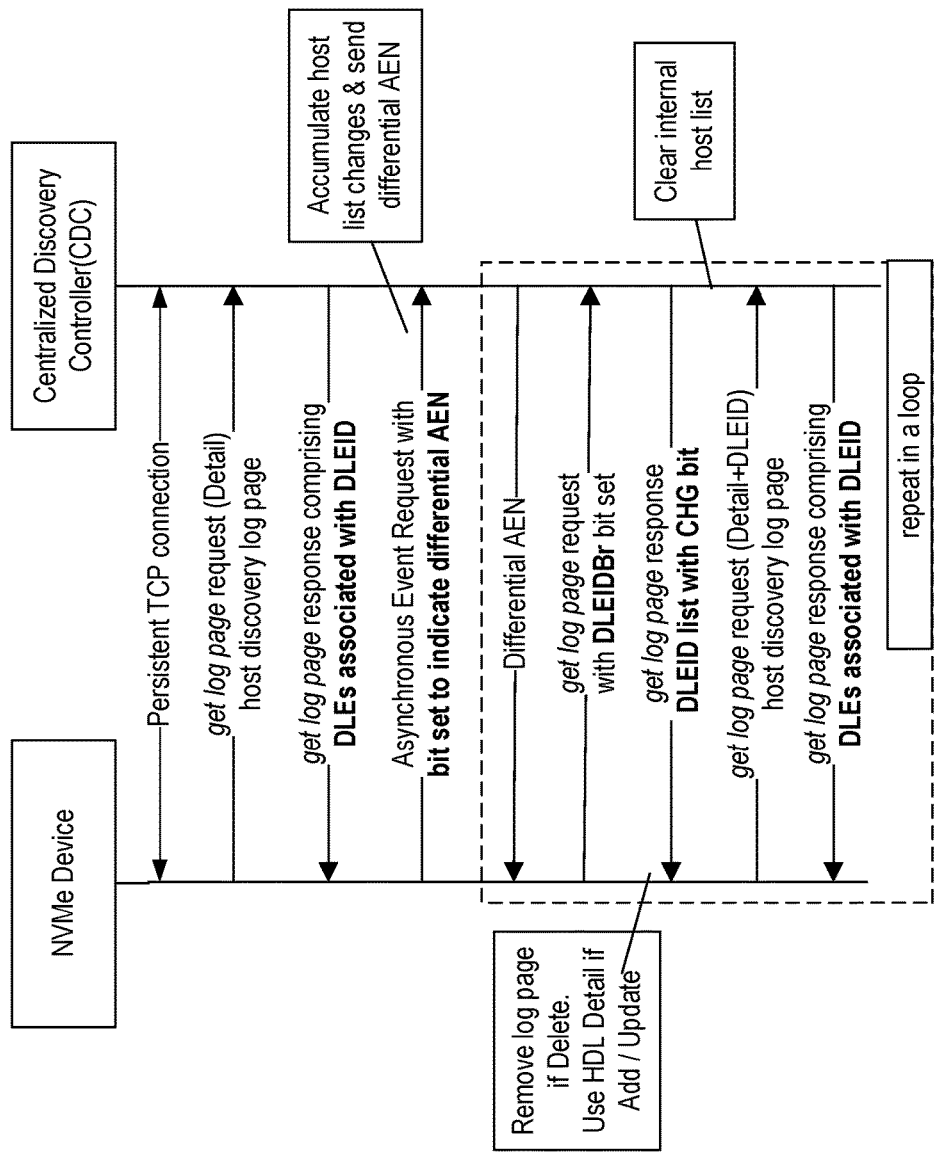
FIG. 5 depicts an exemplary application of Discovery Log Entry Identifier (DLEIDs) to communicate differential AENs to reduce overall processing of discovery information in an NVMe-oF™ environment, according to embodiments of the present disclosure.

FIG. 5 depicts an exemplary application of DLEIDs to communicate differential AENs to reduce overall processing of discovery information in an NVMe® environment, according to embodiments of the present disclosure. In one or more embodiments, to facilitate a differential response, a subsystem such as the NVMe® device in FIG. 5 may send, e.g., after a persistent TCP connection between the NVMe® device and the CDC has been established, a host discovery get log page command to the CDC to query the CDC for a list of hosts. The host discovery get log page command may comprise a DLEIDBr bit that denotes whether the query seeks a list of DLEIDs or identifiers to be returned, which are associated with entries for devices that have experienced a recent status change (such as an addition, deletion, or update) or, conversely, whether the query seeks discovery log pages comprising a list of all hosts that an entity that may be identified in the command Dword15 may access, e.g., irrespective of zoning considerations.

In accordance with the HDLPF shown in Table 5 above, in one or more embodiments, if the DLEIDBr bit is set and command Dword15 comprises no DLEID, the CDC may return host discovery log page responses comprising a list of discovery log page entries for those entries associated with DLEIDs that have experience a recent change, e.g., since the last host discovery log, wherein the host discovery log page responses may comprise the type of change in the CHG bit. In one or more embodiments, if the DLEIDBr bit is set and command Dword15 does comprise a DLEID, the CDC may return recent information associated with the DLEID, e.g., according to the type of change specified in a CHG bit. In one or more embodiments, if the DLEIDBr bit is not set and no DLEID is specified, the CDC may return a host discovery log page response that comprises a list of all hosts in the zone. Further, in one or more embodiments, if the DLEIDBr bit is not set and command Dword15 does comprise a DLEID, the CDC may return a full host discovery log page response comprising information specific to the DLEID specified in command Dword15.

As illustrated in FIG. 5, in one or more embodiments, a DLEID may be used in differential AENs to advantageously reduce the amount of data that needs to be processed when the amount of discovery information that changed is relatively small, e.g., when only one host has recently logged in. In such situations, the NVMe® device may use a DLEIDBr bit in a HDLPF of a get log page request to request from the CDC a list of DLEIDs that are affected by a change on a subsystem known to the CDC, including, e.g., information about the type of change, or to request information about a specific DLEID. The NVMe® device may select the DLEID from a differential AEN, such that shown in Table 7 above, which the CDC may send in response to the NVMe® device asking for the differential AEN, e.g., by sending to the CDC an AER that comprises a flag that requests a differential AEN.

It is noted that changes to host lists may be retrieved by setting the DLEIDBr bit in the HDLPF. As indicated in FIG. 5, the CDC may accumulate an internal list of DLEIDs that have changed since the last HDL request. In one or more embodiments, instead of sending AENs for every host that is added to the fabric, the CDC may (e.g., periodically) send a differential AEN. Further, the CDC may clear the internal list after each host discovery log page response and respond to a get log page request that has the DLEIDBr bit set with a get log page response, such as that shown in Table 6 above.

Figure 6:
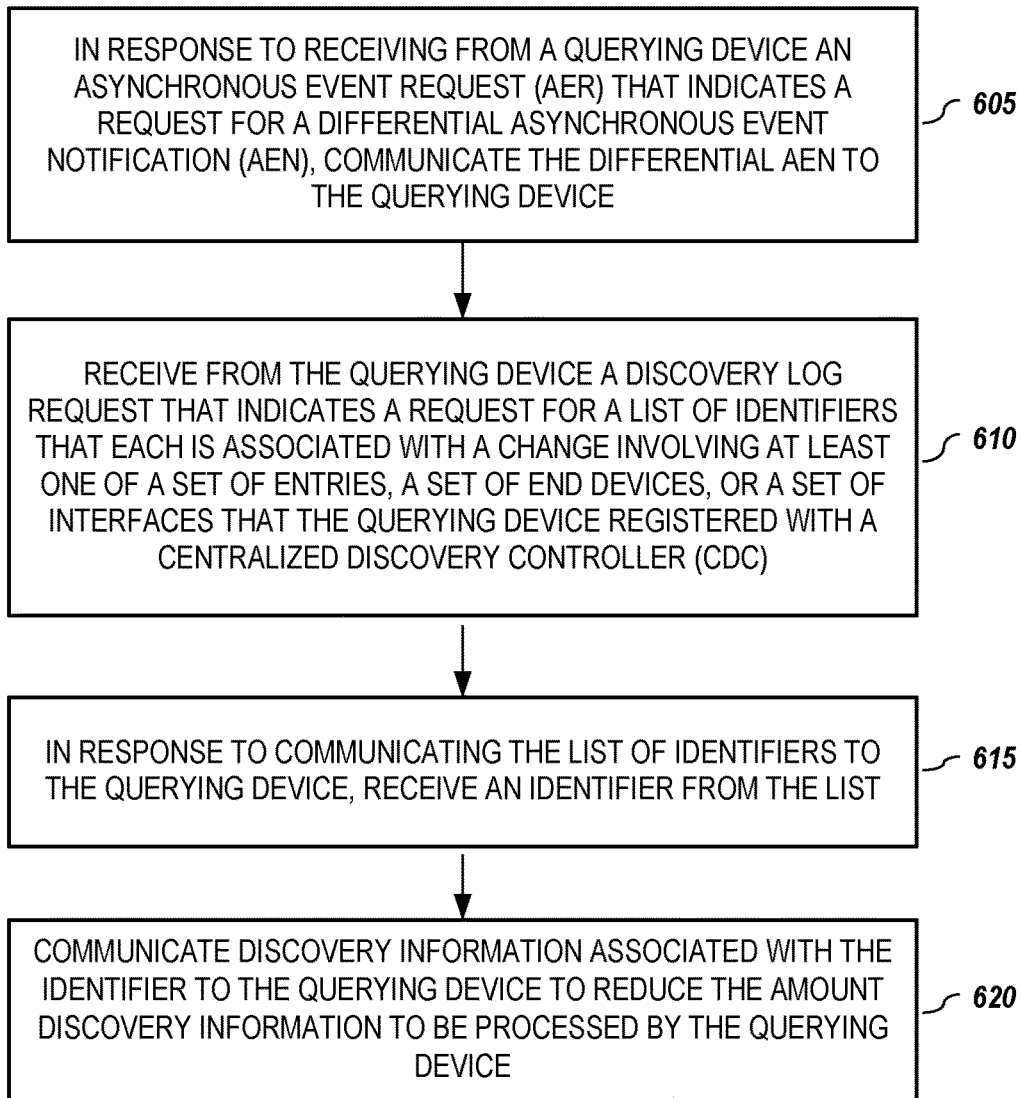
FIG. 6 depicts a flowchart illustrating a process for using differential AENs in NVMe-oF™ systems, according to embodiments of the present disclosure.

FIG. 6 depicts a flowchart illustrating a process for using differential AENs in NVMe-oF™ systems, according to embodiments of the present disclosure. In one or more embodiments, process 600 may start when, in response to a CDC receiving from a querying device an AER that indicates a request for a differential an AEN, the CDC communicates (605) the differential AEN to the querying device. The CDC may receive (610) from the querying device a discovery log request that indicates a request for a list of identifiers that each is associated with a change involving at least one of a set of entries, a set of end devices, or a set of interfaces that the querying device registered with the CDC. In one or more embodiments, in response to the CDC communicating the list of identifiers to the querying device, the CDC may receive (615) an identifier from the list and communicate (620) discovery information associated with the identifier to the querying device to reduce an amount discovery information that is to be processed by the querying device.

Figure 7:
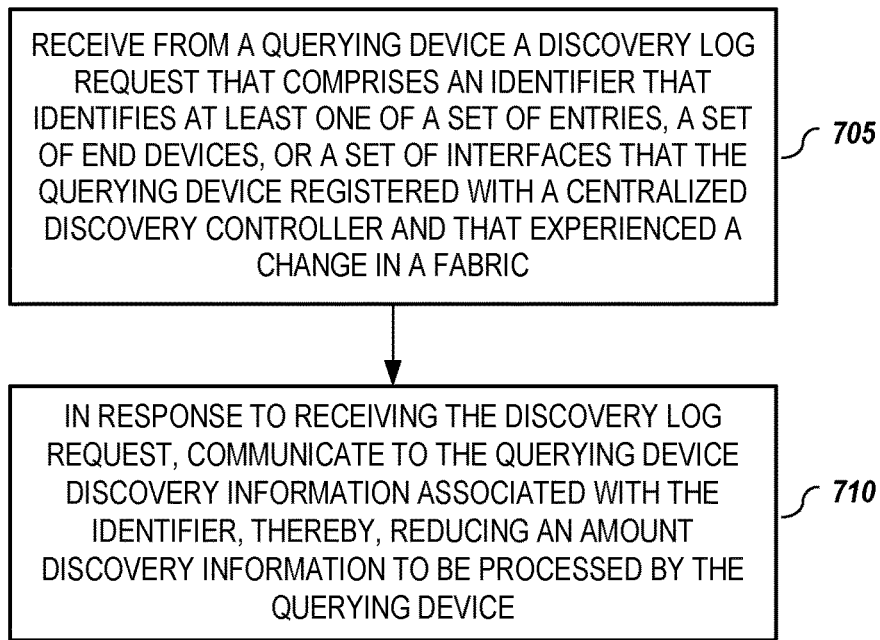
FIG. 7 is a flowchart illustrating a simplified process for using differential AENs in NVMe-oF™ systems, according to embodiments of the present disclosure.

FIG. 7 is a flowchart illustrating a simplified process for using differential AENs in NVMe-oF™ systems, according to embodiments of the present disclosure. In one or more embodiments, process 700 may start when, a CDC receives from a querying device a discovery log request that comprises an identifier that identifies at least one of a set of entries, a set of end devices, or a set of interfaces that the querying device registered with the CDC and that experienced a change in a fabric system. In one or more embodiments, in response to receiving the discovery log request, the CDC may communicate (710) to the querying device discovery information associated with the identifier, thereby, reducing an amount discovery information to be processed by the querying device.

Figure 8A:
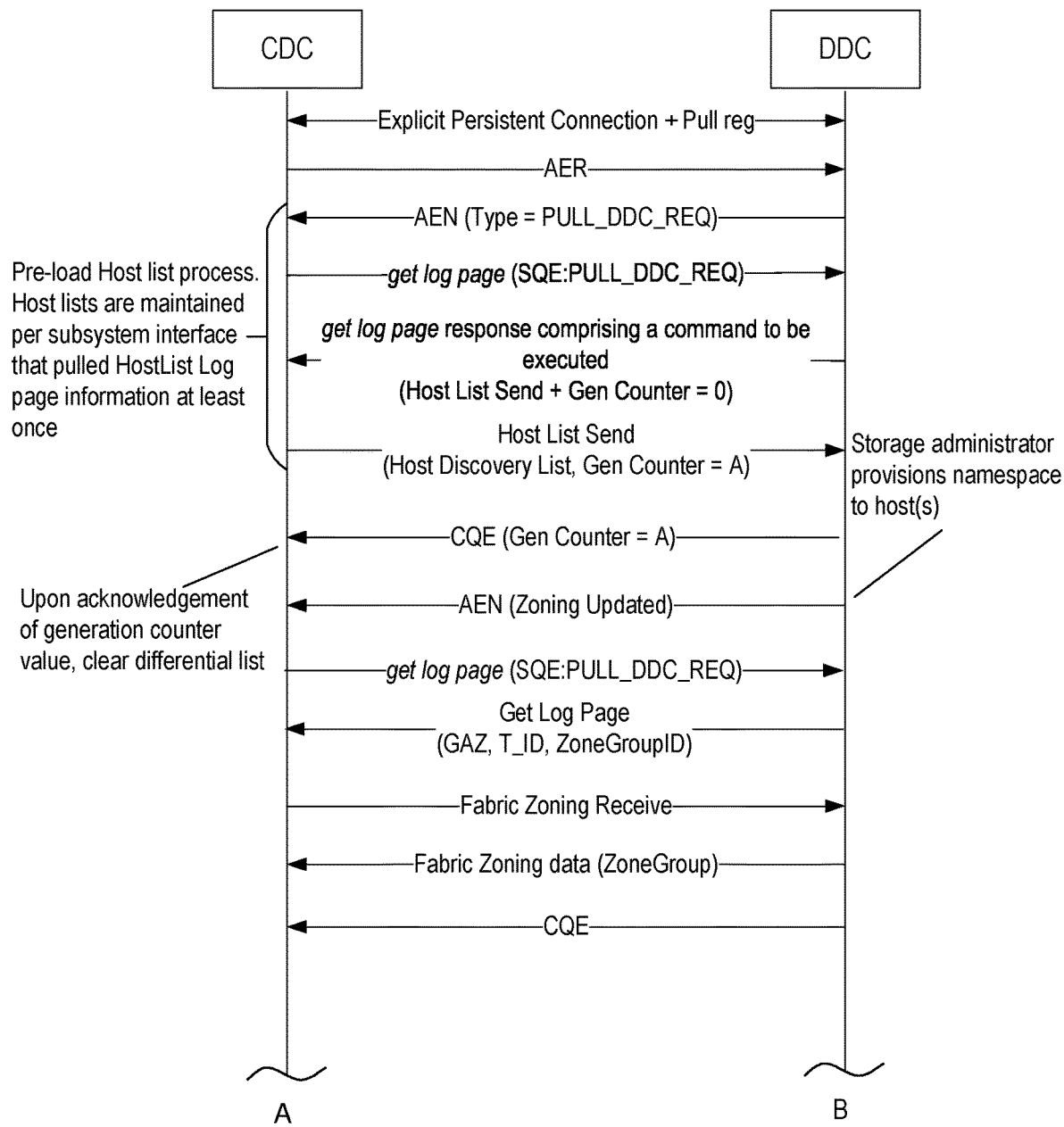
FIG. 8A-FIG. 8C depict an exemplary communication between an NVMe® host, a CDC, and a direct discovery controller (DDC) in an NVMe-oF™ system, according to embodiments of the present disclosure.
Figure 8B:
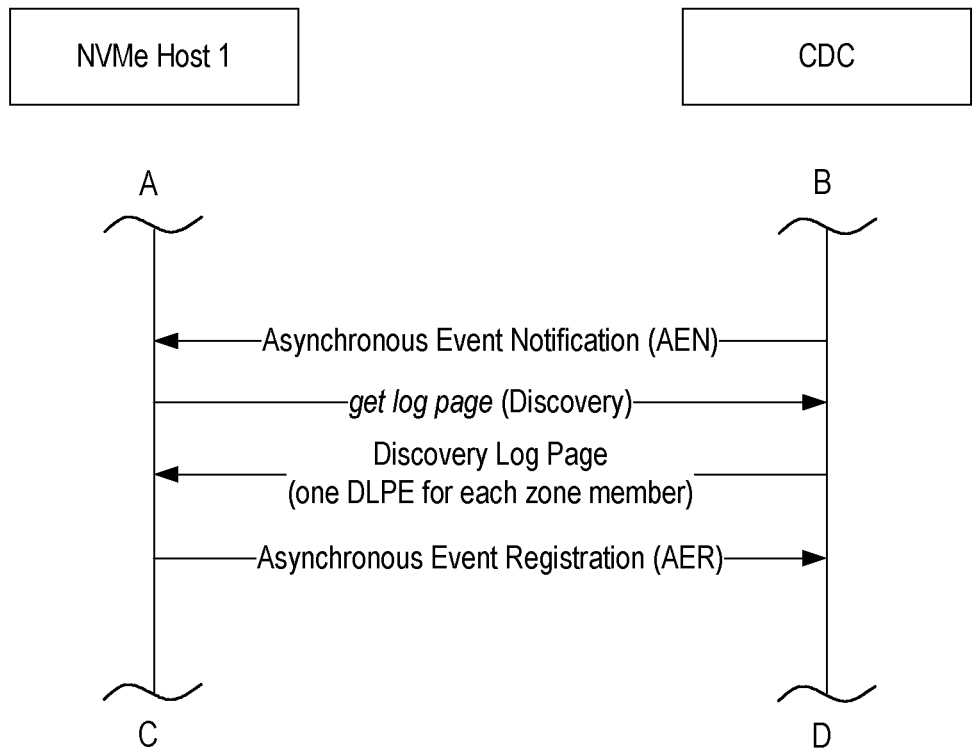
Figure 8C:
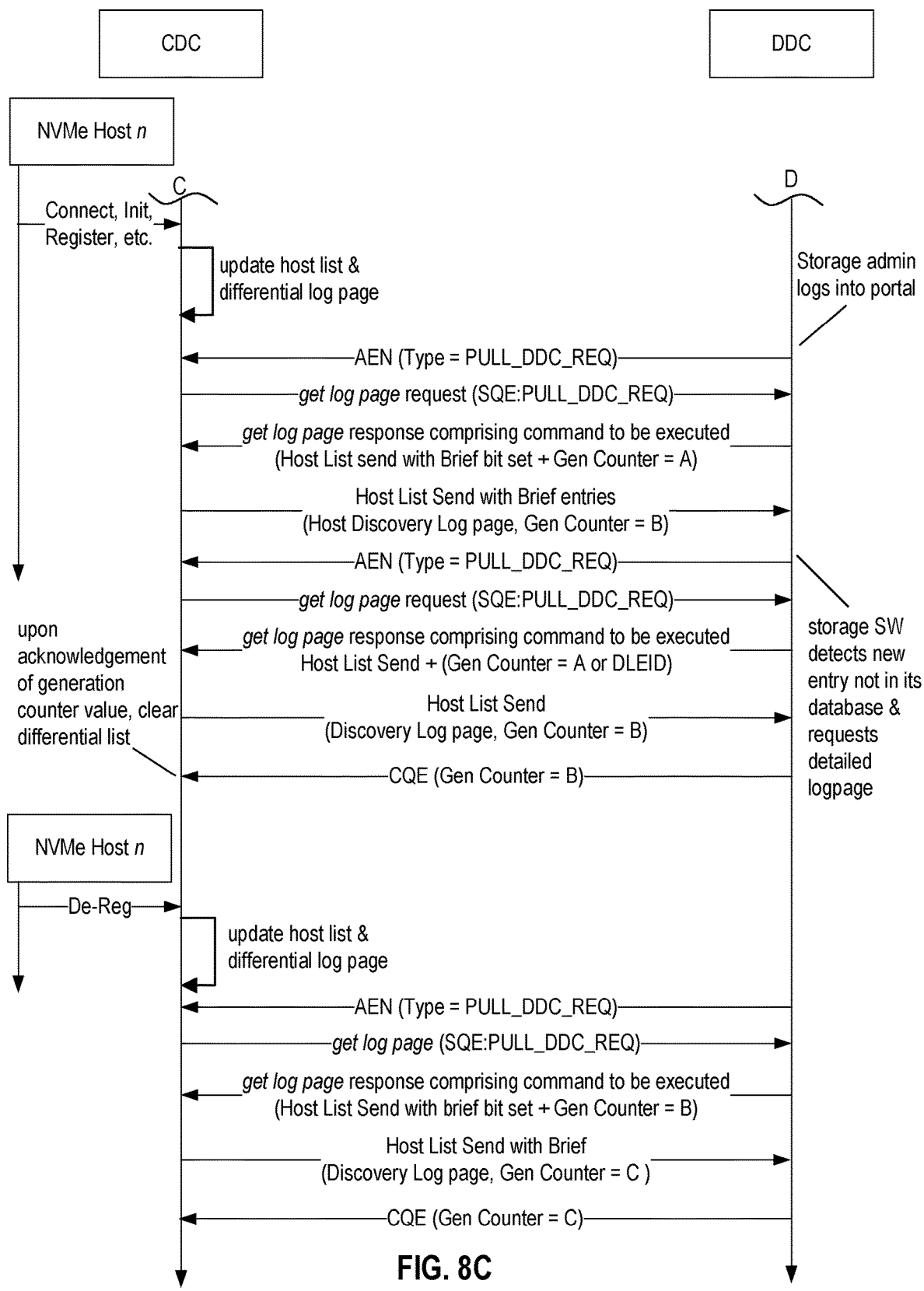

FIG. 8A-FIG. 8C depict exemplary communications between an NVMe® host, a CDC, and a DDC of a storage subsystem in an NVMe-oF™ system, according to embodiments of the present disclosure. In one or more embodiments, a CDC and a DDC may establish an explicit persistent connection, e.g., by using a pull registration in which the CDC pulls registration information from the DDC and automatically registers this information on behalf of the DDC. Once a connection is established, the CDC may send to the DDC an AER. Since the DDC is typically an entity that does not initiate commands, in order to get the CDC to perform an action, the DDC may respond with an AEN (denoted in FIG. 8A as having the type "pull_DDC_req") to cause the CDC to send a get log page request that inquires about an action that the CDC should perform. The DDC may respond with a get log page response that comprises the specific command that DDC wants the CDC to execute, here "Host List Send," that may cause the CDC to communicate a host discovery list as the log page content to the DDC.

In one or more embodiments, the DDC may further send a generation counter (denoted "Gen Counter" in FIG. 8A), e.g., to prompt the CDC to track the count to prevent potential changes from invalidating a get log page response the CDC has received. In one or more embodiments, the CDC may increment the counter value and execute the requested command by sending back to the DDC a host discovery list comprising, e.g., all hosts known to the CDC at that point. In this manner, the CDC may maintain a host list for each subsystem interface that pulled a host list discovery log page from the CDC at least once. The DDC may reply with a completion queue entry (CQE), e.g., to confirm the counter value as incremented or updated.

Similarly, in one or more embodiments, the DDC may use an AEN command to prompt the CDC to inquire about new zoning information held by the DDC, e.g., once a storage administrator provisions namespaces for one or more hosts. Once the DDC and the CDC exchange zoning information and zoning has been activated, the CDC may send an AEN to Host 1. As depicted FIG. 8B, Host 1 may reply with a get log page request for a full list of discovery log page entries to obtain from the CDC a list that may comprise one DLPE for each zone member. Host 1 may further send an AER to the CDC to inquire about any other changes.

In one or more embodiments, once a new host (denoted "Host n" in FIG. 8C) enters the NVMe-oF™ environment, e.g., by performing steps such as sending to the CDC a connect command to establish a connection, registering with the CDC, etc., the CDC may update the host list and a differential log page that keeps track of and includes changes that occurred since the counter was set to value A.

A storage administrator may log into a management portal (not shown) of the DDC to provision storage to newly added Host n, which may cause the DDC to reply to a previous AER (shown in FIG. 8B) by the CDC with an AEN that indicates that a change may have occurred. The AEN may trigger the CDC to send a get log page request to inquire about any changes. In one or more embodiments, the DDC's get log page response may comprise a to-be-executed command and a DLEIDBr bit, such as that mentioned with respect to Table 5 above, that indicates a request for a host list that comprises "Brief" entries, i.e., entries associated with those derives that have experienced a change since the counter was set to the value A, thus, avoiding to have to process the number of full discovery log page responses. Because in this example the only change since the counter value was set to A involves one new host, namely Host n, the CDC may send to the DDC the requested host discovery list that comprises entries regarding Host n.

At this point, the DDC, e.g., in response to its storage software detecting a new entry for Host n in its database, may request a detailed log page about that change. In one or more embodiments, the DDC may do so, e.g., by sending an AEN to trigger a new get log page request from the CDC, to which the DDC may respond with a get log page response that instead of including a DLEIDBr bit comprises a to-be-executed command to request a detailed log page.

In one or more embodiments, the get log page response may further comprise a counter value (e.g., A) or, alternatively, DLEIDs indicating either a time period since the counter value has been updated (here, to the value A) or the corresponding DLEIDs. As a result, the CDC may send to the DDC a host discovery list that comprises Host n information since the counter was updated to the value A and increment the value, here, to counter value B. The DDC may reply with a CQE, e.g., to confirm the updated counter value B or notify the CDC that the DDC is now using the new counter value. As depicted in FIG. 8C, upon an acknowledgement of the new counter value, the CDC may clear the differential host list.

In one or more embodiments, once a host (e.g., Host n in FIG. 8C) is removed from the environment, or is deregistered from the CDC, the CDC may update the differential log page, receive an AEN from the DDC, and perform similar steps as after being registering, with the main difference that the discovery log page that the DDC receives indicates that a host has been removed or deregistered. It is noted that the host discovery list is not constrained by existing zoning configurations to only accessible hosts. To the contrary, the host discovery list may be used to create zoning configurations.

Figure 9:
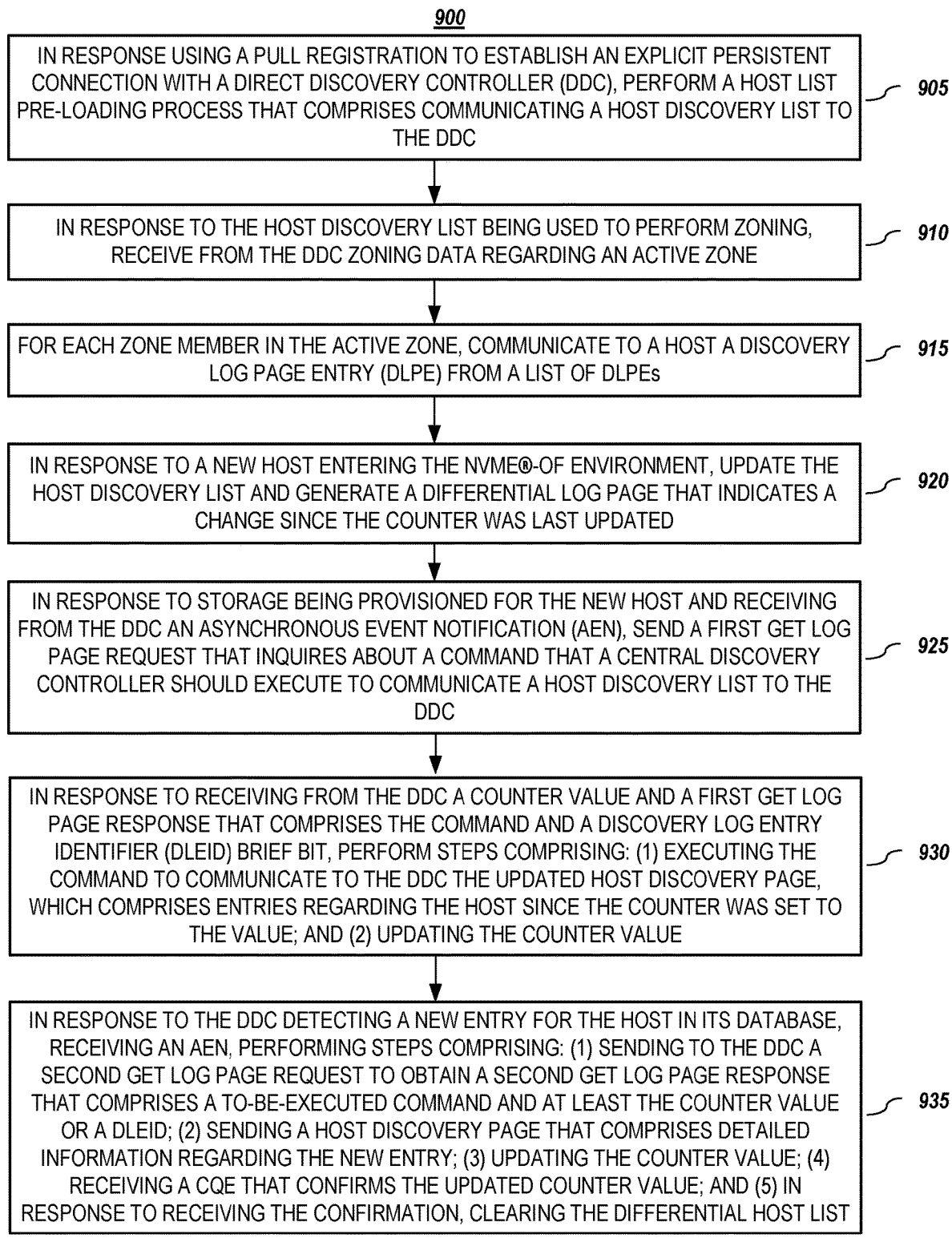
FIG. 9 is a flowchart illustrating a process for using DLEIDs in connection with pull registrations, according to embodiments of the present disclosure.

FIG. 9 is a flowchart illustrating a process for using DLEIDs in connection with pull registrations, according to embodiments of the present disclosure. In one or more embodiments, process 900 may start when, in response to establishing an explicit persistent connection with a DDC by using a pull registration, a CDC performs (905) a host list pre-loading process that comprises communicating a host discovery list to the DDC. The pre-loading process may comprise sending to the DDC an AER to trigger an AEN that causes the CDC to send a third get log page request that inquires about a command that the CDC should execute to communicate the host discovery list to the DDC. The pre-loading process may further comprise, in response to receiving a counter value and a third get log page response that comprises the command, performing steps comprising: (1) executing the command to communicate the host discovery list to the DDC; (2) updating the counter value; and (3) receiving a confirmation that the counter value has been updated. In one or more embodiments, in response to the host discovery list being used to perform one or more zoning operations, the CDC may receive (910) from the DDC zoning data regarding an active zone and communicate (915) to a host a DLPE from a list of DLPEs for each zone member in the active zone.

In one or more embodiments, in response to a new host entering the NVMe-oF™ environment, the CDC may update (920) the host discovery list and generate a differential log page that indicates a change since the counter was last updated. In response to storage being provisioned for the new host and receiving from the DDC an AEN, the CDC may send (925) a get log page request that inquires about a command that the CDC should execute to communicate a host discovery list to the DDC.

In one or more embodiments, in response to receiving from the DDC a counter value and a get log page response that comprises the command and a DLEID brief bit, the CDC may perform (930) steps comprising: (1) executing the command to communicate to the DDC the host discovery list, which comprises entries regarding the host since the counter was set to the value; and (2) updating the counter value.

In one or more embodiments, in response to the DDC detecting a new entry for the host in its database, the CDC may receive (935) an AEN and perform steps comprising: (1) sending to the DDC a second get log page request to obtain a second get log page response that comprises a to-be-executed command and at least one of the counter value or a DLEID; (2) sending to the DDC a host discovery list that comprises detailed log page information regarding the new entry; (3) updating the counter value; (4) receiving from the DDC a CQE that confirms the updated counter value; and (5) in response to receiving the confirmation, clear the differential host list.

Figure 10:
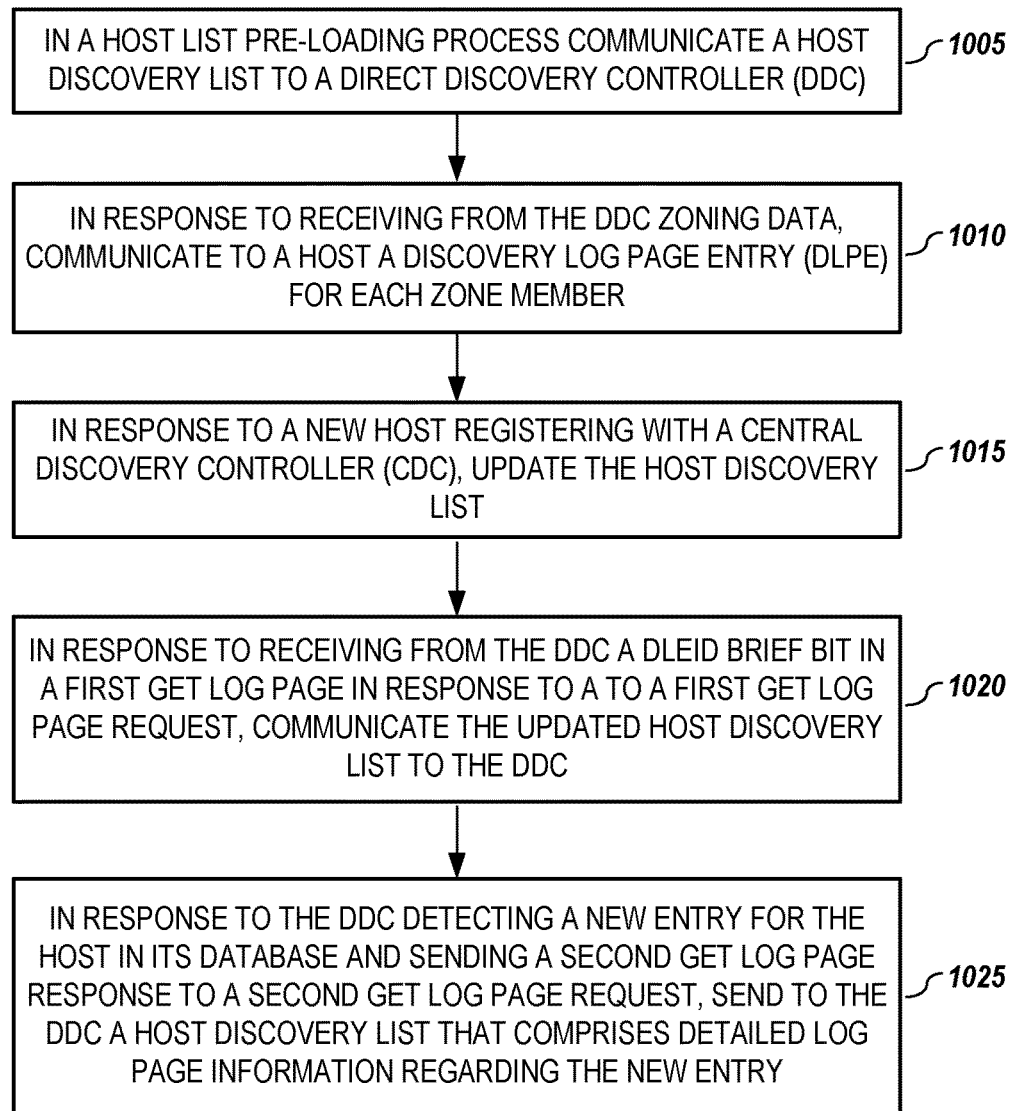
FIG. 10 is a flowchart illustrating a simplified process for using DLEIDs in connection with pull registrations, according to embodiments of the present disclosure.

FIG. 10 is a flowchart illustrating a simplified process for using DLEIDs in connection with pull registrations, according to embodiments of the present disclosure. In one or more embodiments, process 1000 may start when, e.g., in a host list pre-loading process, a CDC communicates (1005) a host discovery list to a DDC. In response to receiving from the DDC zoning data, the CDC may communicate (1010) to a host a DLPE for each zone member. In one or more embodiments, in response to a new host registering with the CDC, the CDC may update (1015) the host discovery list and, in response to receiving from the DDC a DLEID brief bit in a get log page response, communicate (1020) the updated host discovery list to the DDC. Finally, in response to the DDC detecting a new entry for the host in its database and sending a second get log page response to a second get log page request, the CDC may send (1025) to the DDC a host discovery list that comprises detailed log page information regarding the new entry.

Push model embodiments can be beneficial in certain instances. For example, push model embodiment CDCs are more responsive to DDC events and directly support DDC-initiated functionality, such as discovery information registrations, discovery information de-registrations, and zoning operations. However, the typical DDC-controller-to-CDC-controller issue noted above may also be resolved to allow for pull model embodiments. Pull model embodiments are also beneficial in certain instances. For example, pull model embodiments can provide for more predictable behavior for power-up events (e.g., simultaneous power-up of a large number of hosts and storage systems attached to the same fabric) and can provide supported functions, such as discovery information registrations, discovery information de-registrations, among others.

Figure 11:
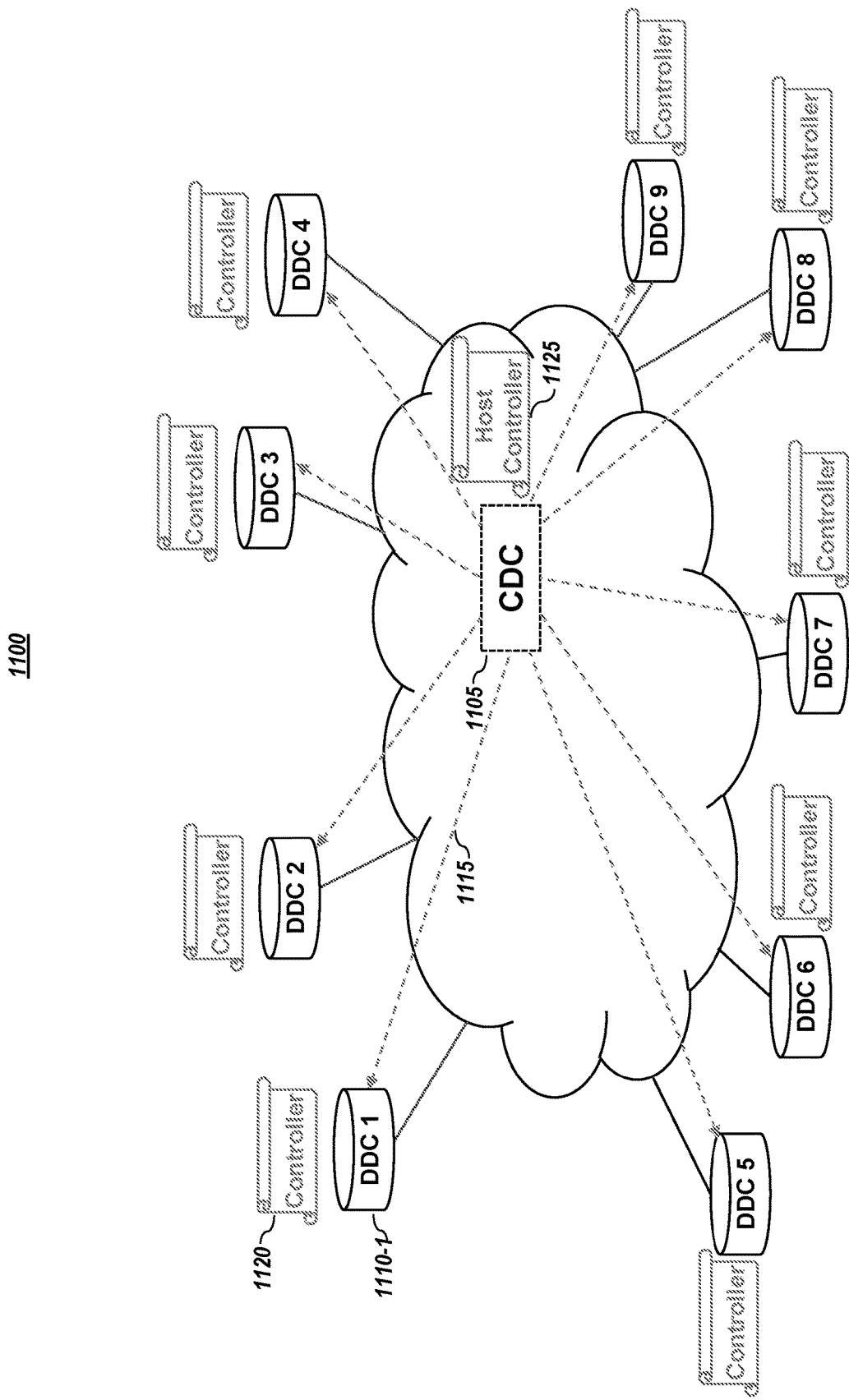
FIG. 11 depicts an NVMe® environment that supports pull model functionality, according to embodiments of the present disclosure.

FIG. 11 depicts an NVMe™-over Fabrics (NVMe-oF™) environment that support pull model functionality, according to embodiments of the present disclosure. In the depicted embodiment, DDCs implement controller functionality (e.g., 1120). However, the CDC 1125 supports controller and at least some host functionality 1125 (such as host functionality for discovery and zoning purposes). Because the CDC supports host functionality, it can send commands 1115 to the DDCs. For example, CDC 1105 can send a command to DDC-1 1110-1. Note that in this structure, the DDC maintains its functionality as solely a controller 1120 but is enhanced to support pull model embodiments.

A pull model DDC may execute commands but, by definition, it does not issue commands. In certain interactions between a DDC and a CDC, the DDC might want to initiate some operations. For example, the pull model DDC may want to initialize or update the zoning for a subsystem to which the DDC is associated, or the pull model DDC may want to get information from the CDC, such as host information. However, because the pull model DDC cannot issue commands, currently there is no mechanism by which the DDC can initiate these operations.

Accordingly, embodiments herein provide a solution to the problem of how to allow a pull model DDC to effect a command or operation requested by the DDC under the limitation that a pull model DDC does not send commands. In one or more embodiments, a solution comprises defining and using a new Asynchronous Event Notification (AEN) type that essentially indicates "I [the DDC] am a pull model device, I want you [the CDC] to do something." In response to such an AEN, in one or more embodiments, a Get Log Page (GLP) command follows that essentially asks the DDC: "What do you want?"—rather than the typical GLP command, which states to the DDC: "Give me this requested information." Using these notifications and commands in such a way represents a significant transformation and paradigm shift. Note also, that the data portion of a Get Log Page response allows for flexibility in specifying what is requested (e.g., an individual command or an operation that comprises a set of commands).

Figure 12:
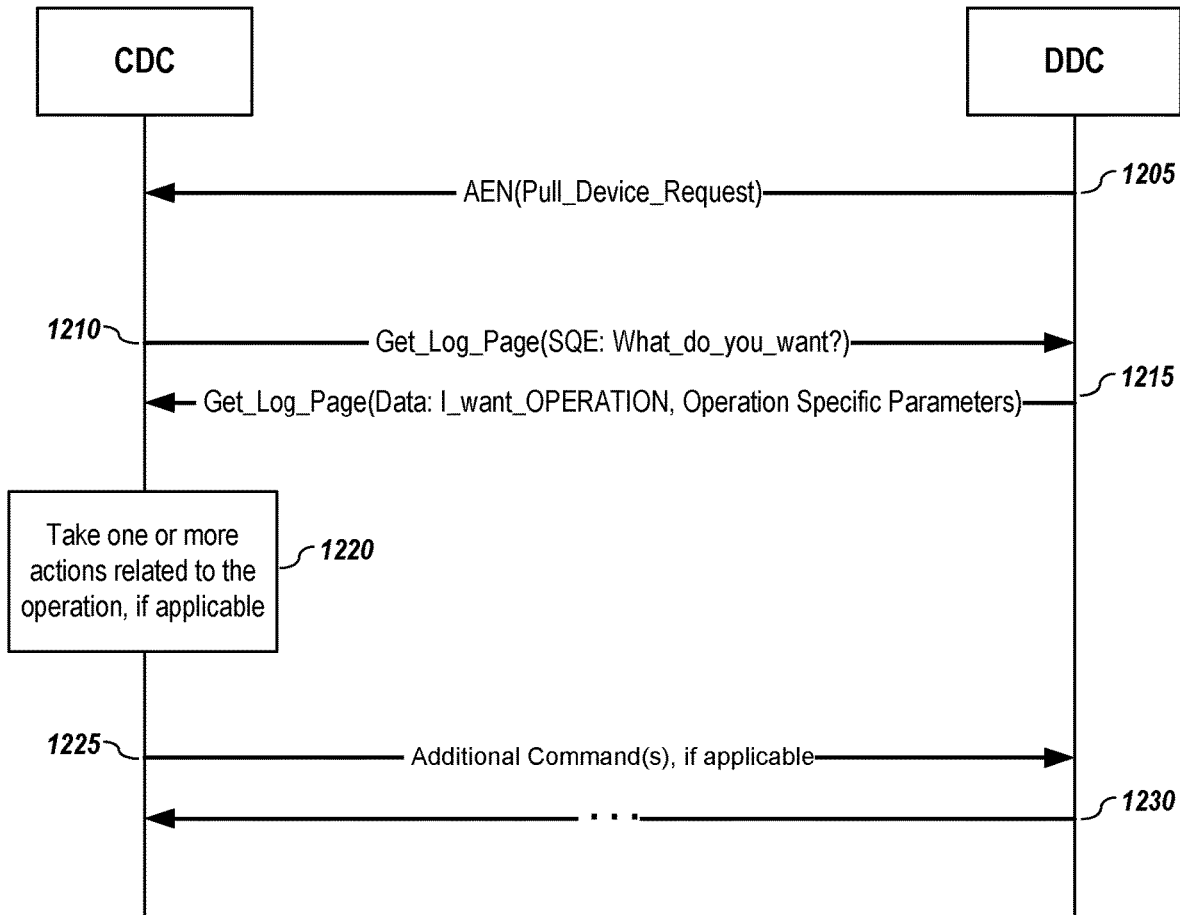
FIG. 12 depicts a general command execution request for a pull model device, according to embodiments of the present disclosure.

FIG. 12 depicts a general command execution request for a pull model device, according to embodiments of the present disclosure. In one or more embodiments, the direct discovery controller (DDC) sends (1205) an Asynchronous Event Notifications (AEN) to the centralized discovery controller (CDC). In the Completion Queue Entry (CQE) of the AEN, there may be an indicator/value (e.g., F3h) for the "Asynchronous Event Type" to indicate that this AEN is a "Pull DDC Request" notice. A "Pull DDC Request" notice may be defined to indicate to the CDC that a pull model DDC is requesting the CDC to perform an operation on the DDC's behalf.

Note that the AEN (1205) may be a response to a prior Asynchronous Event Request (AER) command (which is not depicted in FIG. 12) that the CDC sent to the DDC. An AER is a mechanism by which a sender of the AER can request to receive a notice when there is a change (e.g., a state change) at or to the recipient of the AER. In one or more embodiments, the CDC may subscribe (e.g., using Asynchronous Event Configuration (Feature Identifier 0Bh) or a feature that provided for such subscription functionality) to get notifications for a certain duration, certain number of changes, certain types of changes, or may be a standing request that remains in force until cancelled. Thus, in one or more embodiments, in FIG. 12, it may be assumed that at some point before the AEN (1205), the CDC sent an AER to the DDC to register to receive a notice from the DDC.

In response to the AEN, the CDC performs (1210) a response activity. In one or more embodiments, the response activity is a Get Log Page (GLP) command requesting a Pull DDC Request Log Page. The new Pull DDC Request Log Page may be identified by a unique Log Page Identifier (e.g., 73h).

Accordingly, the DDC responds (1215) with the Pull DDC Request Log Page, which is a new type of Log Page that allows the DDC to respond with the operation that the DDC wants performed. In one or more embodiments, the format of the Pull DDC Request Log Page may comprise in the data portion of the GLP response an Operation Request Identifier (ORI), which is a field that indicates the operation that a pull model DDC is requesting a CDC to perform and may also include other operation specific parameters (if applicable). In one or more embodiments, certain Operation Request Identifier values may correspond to certain operations, for example:

| ORI Value | Definition |
| --- | --- |
| 00 | <reserved> |
| 01 | Get Active Zone (GAZ) operation |
| 02 | Add/Replace Active Zone (AAZ) operation |
| 03 | Remove Active Zone (RAZ) operation |
| 04 | Log Page Request operation |
| . . . | <other operations> |

In one or more embodiments, a type-length-value (TLV) structure may be used:
  Type: what is requested (e.g., GAZ)
  Length: length of the provided parameters Value: the operation specific parameters of the request (e.g., {transaction identifier (T_ID), ZoneGroupID})

Depending upon the specific operation, the CDC may take (1220) one or more actions to perform or execute the operation. In one or more embodiments, one or more additional commands (1225, 1230, etc.) may be performed to complete the operation. For example, if the request from the DDC was to obtain a host discovery log page, the CDC may read (1220) data from a database/datastore regarding the host(s) relevant to the requesting DDC and may then transmit (1225) the information to the DDC. Also, in one or more embodiments, the CDC may send another AER so that DDC may send another AEN when it wants another operation performed.

Figure 13:
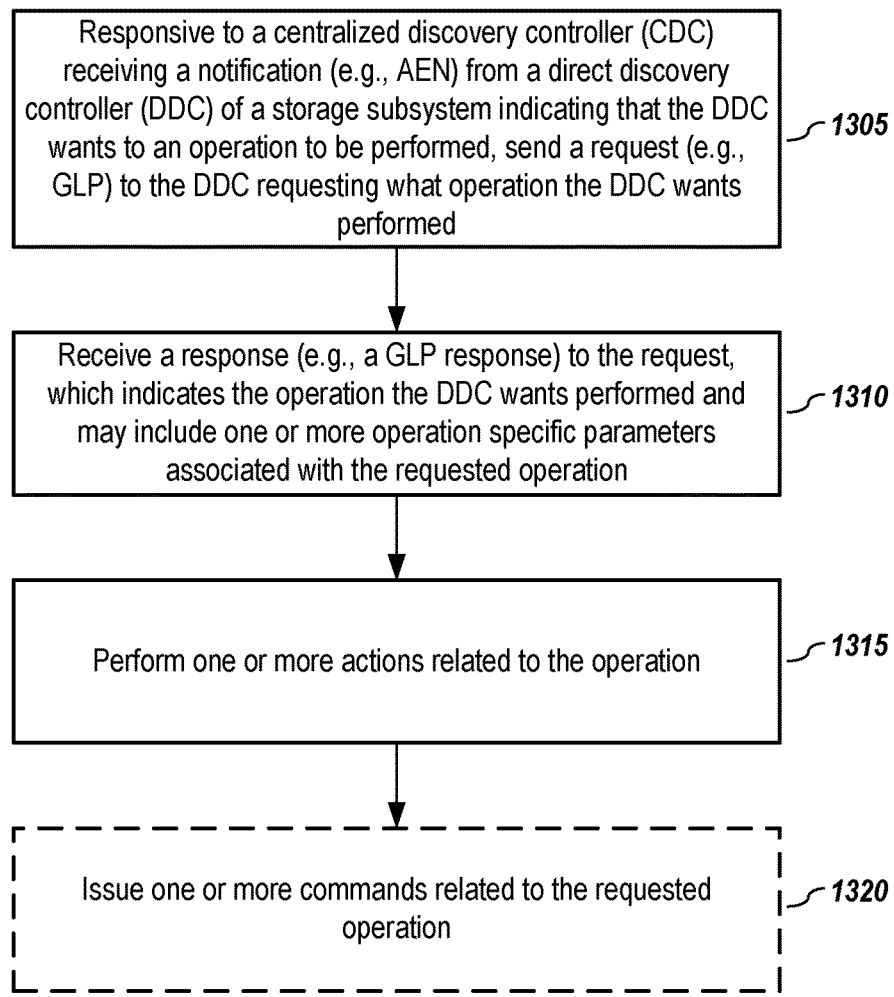
FIG. 13 depicts an alternative command execution request methodology as performed by a CDC, according to embodiments of the present disclosure.

FIG. 13 depicts an alternative command execution request methodology as performed by a CDC, according to embodiments of the present disclosure. In one or more embodiments, responsive to a CDC receiving a notification (e.g., AEN) from a DDC of a storage subsystem indicating that the DDC wants to perform an operation, the CDC sends (1305) a request (e.g., a GLP) to the DDC requesting what operation the DDC wants performed. While not depicted in FIG. 13, the CDC may previously have sent an Asynchronous Event Request (AER) command to request to receive a notice from the DDC. This action enables the DDC to send the AEN. The CDC receives (1310) a response (e.g., a GLP response that contains the contents of a Log Page) to the request, which indicates the operation the DDC wants performed and may include one or more operation specific parameters associated with the requested operation. The CDC may then perform (1315) one or more actions related to the requested operation (if applicable to the requested operation), and may, if applicable, issue (1320) one or more commands related to the requested operation. Also, in one or more embodiments, the CDC may send another AER so that the DDC may send another AEN when it wants another operation performed.

Figure 14:
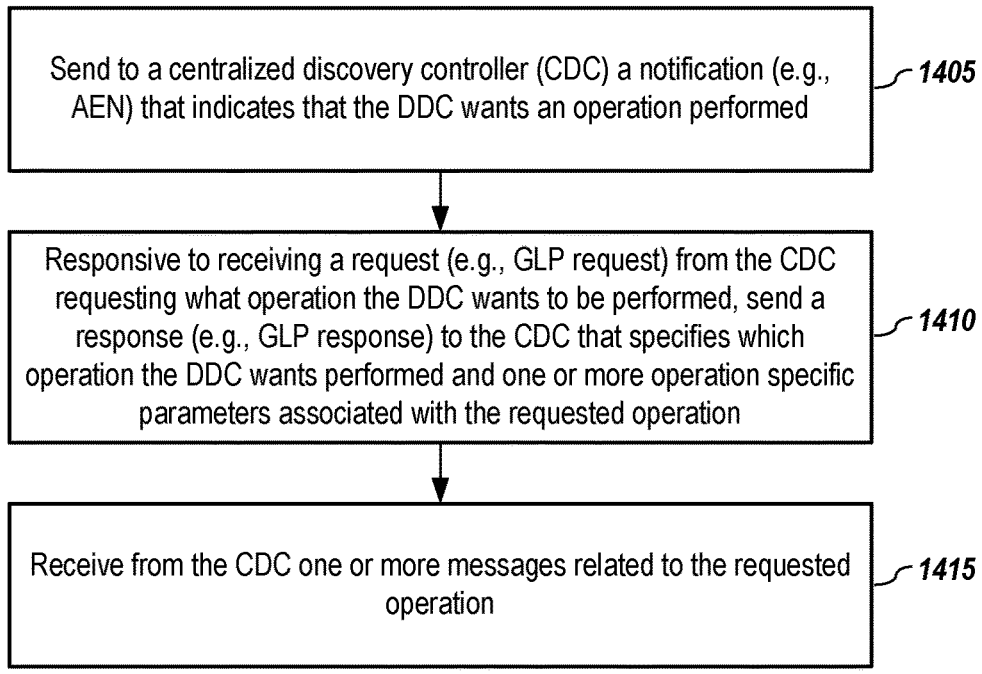
FIG. 14 depicts an alternative command execution request methodology as performed by a pull model DDC, according to embodiments of the present disclosure.

FIG. 14 depicts an alternative command execution request methodology as performed by a pull model DDC, according to embodiments of the present disclosure. In one or more embodiments, the DDC sends (1405) to a CDC a notification (e.g., AEN) that indicates that the DDC wants an operation performed. While not depicted in FIG. 14, the DDC may previously have received from the CDC an Asynchronous Event Request (AER) command, which enables the DDC's sending of the AEN. The DDC receives a CDC response (e.g., GLP request) from the CDC requesting what operation the DDC wants performed, and responsive to receiving the CDC response containing a CDC request, the DDC sends (1410) a DDC response (e.g., GLP response) to the CDC that specifies what the DDC wants performed and may include one or more operation specific parameters associated with the requested operation. In one or more embodiments, the DDC may receive (1415) from the CDC one or more messages related to the requested operation. Also, in one or more embodiments, the DDC may receive another AER from the CDC so that the DDC may send an AEN when it wants another operation performed.

Figure 15:
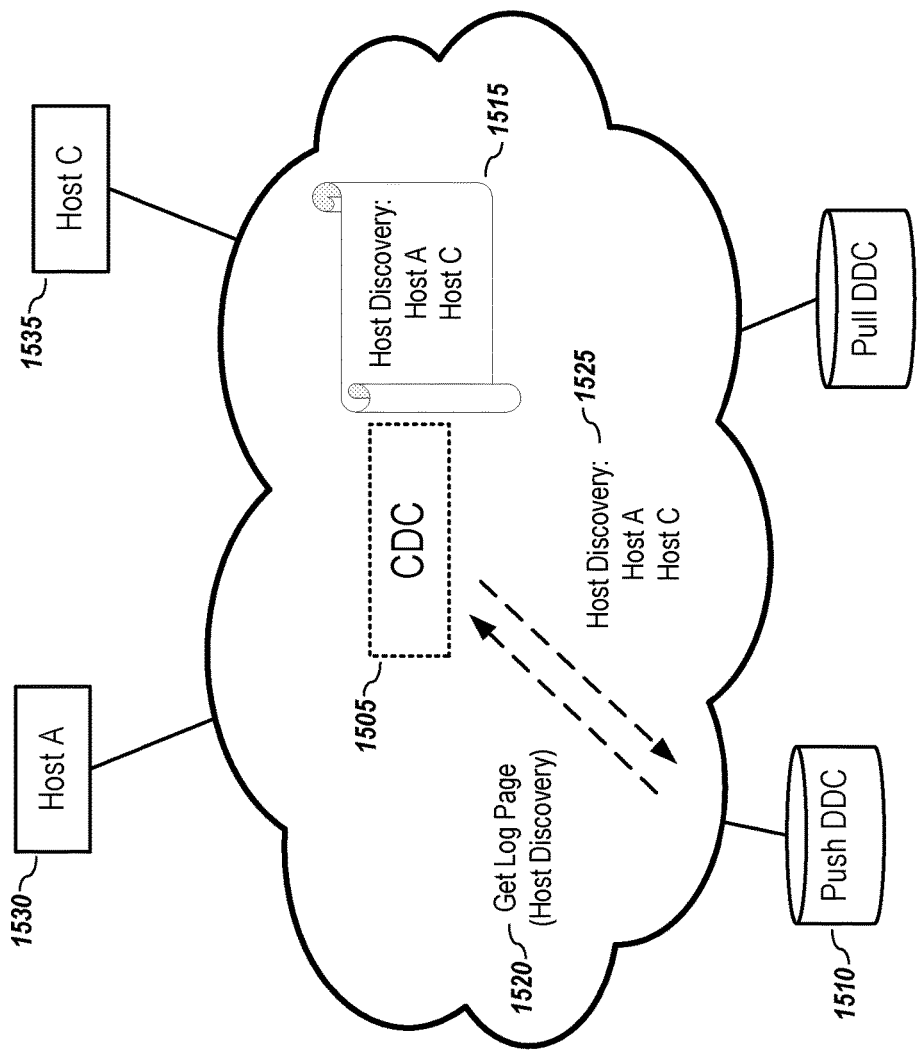
FIGS. 15-17 graphically depict the host discovery processes for a push model, according to embodiments of the present disclosure.
Figure 16:
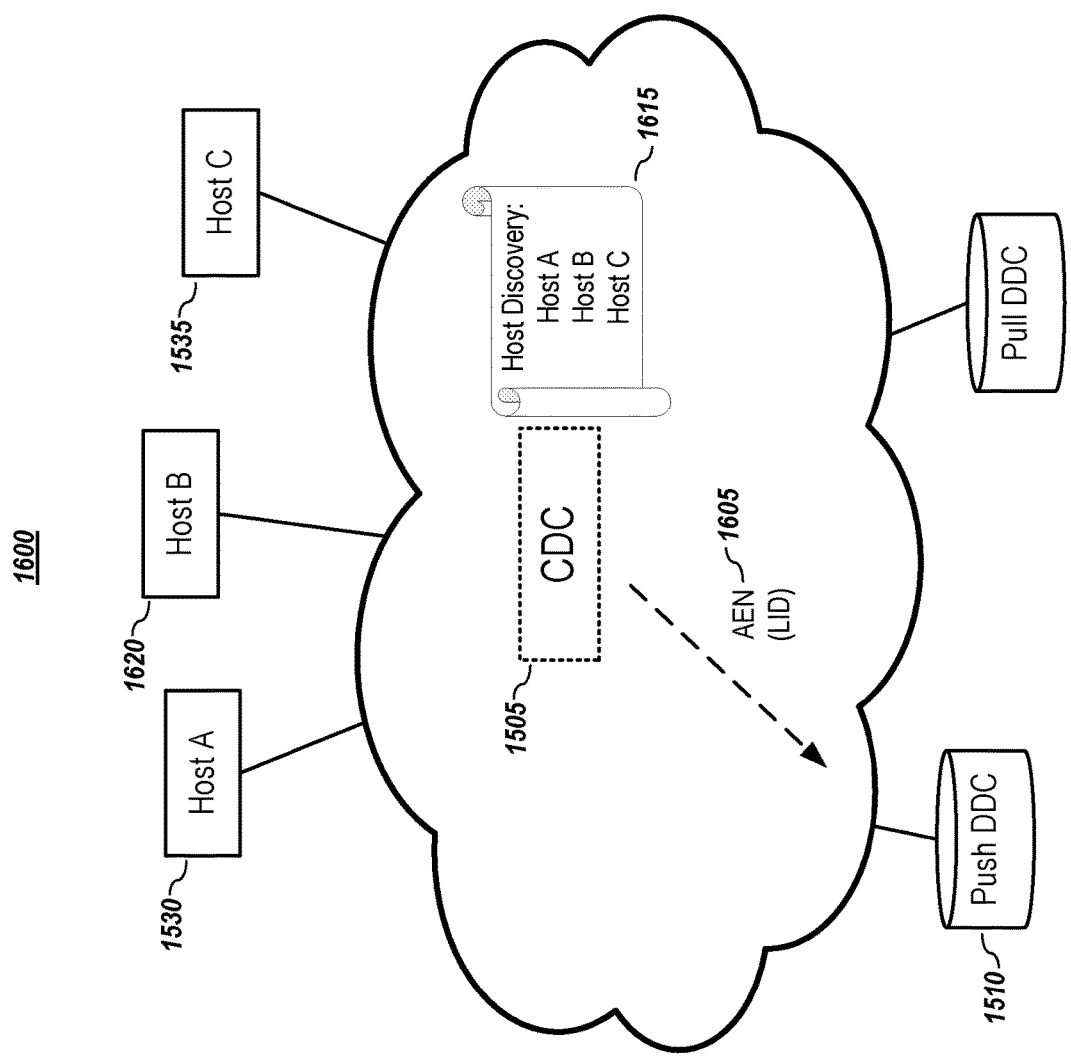
Figure 17:
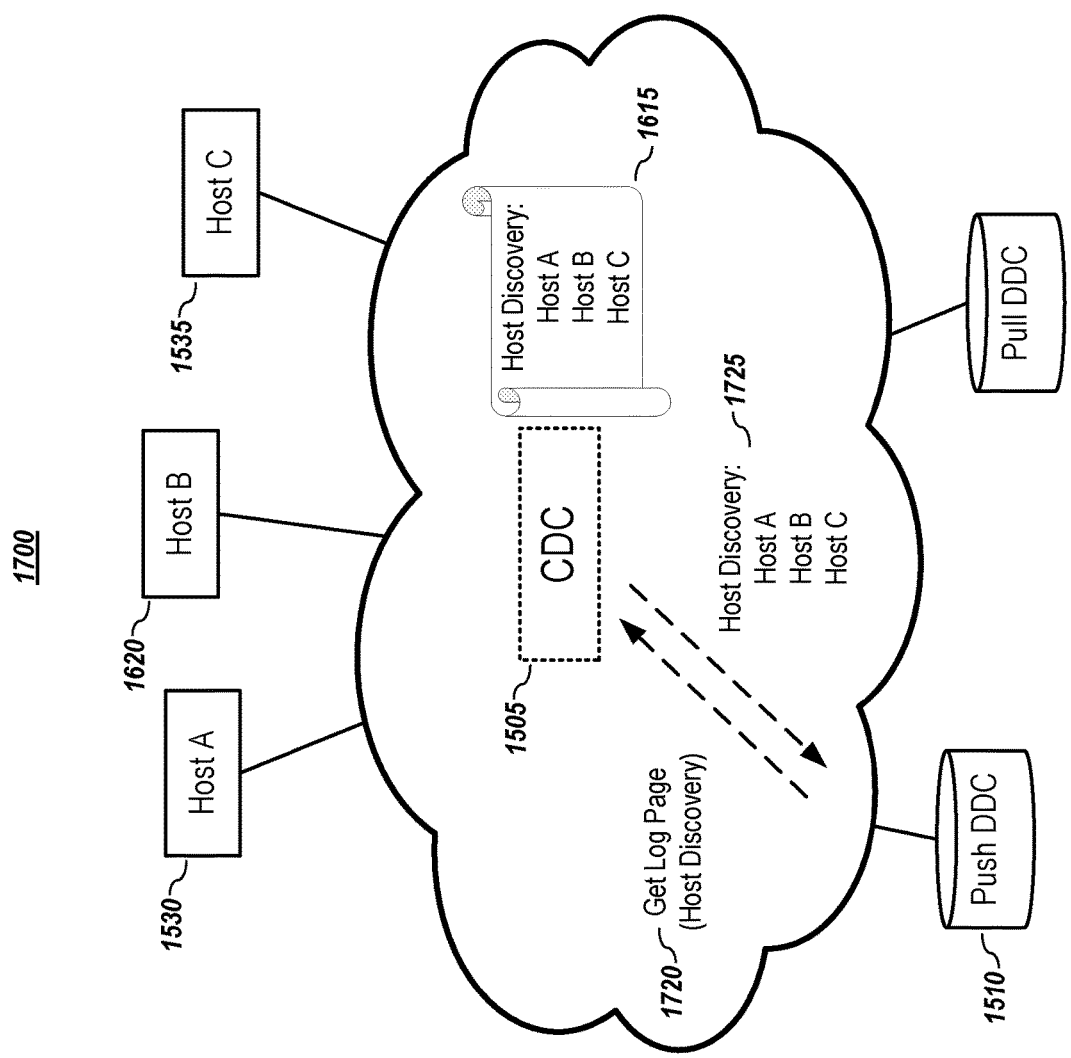
Figure 18:
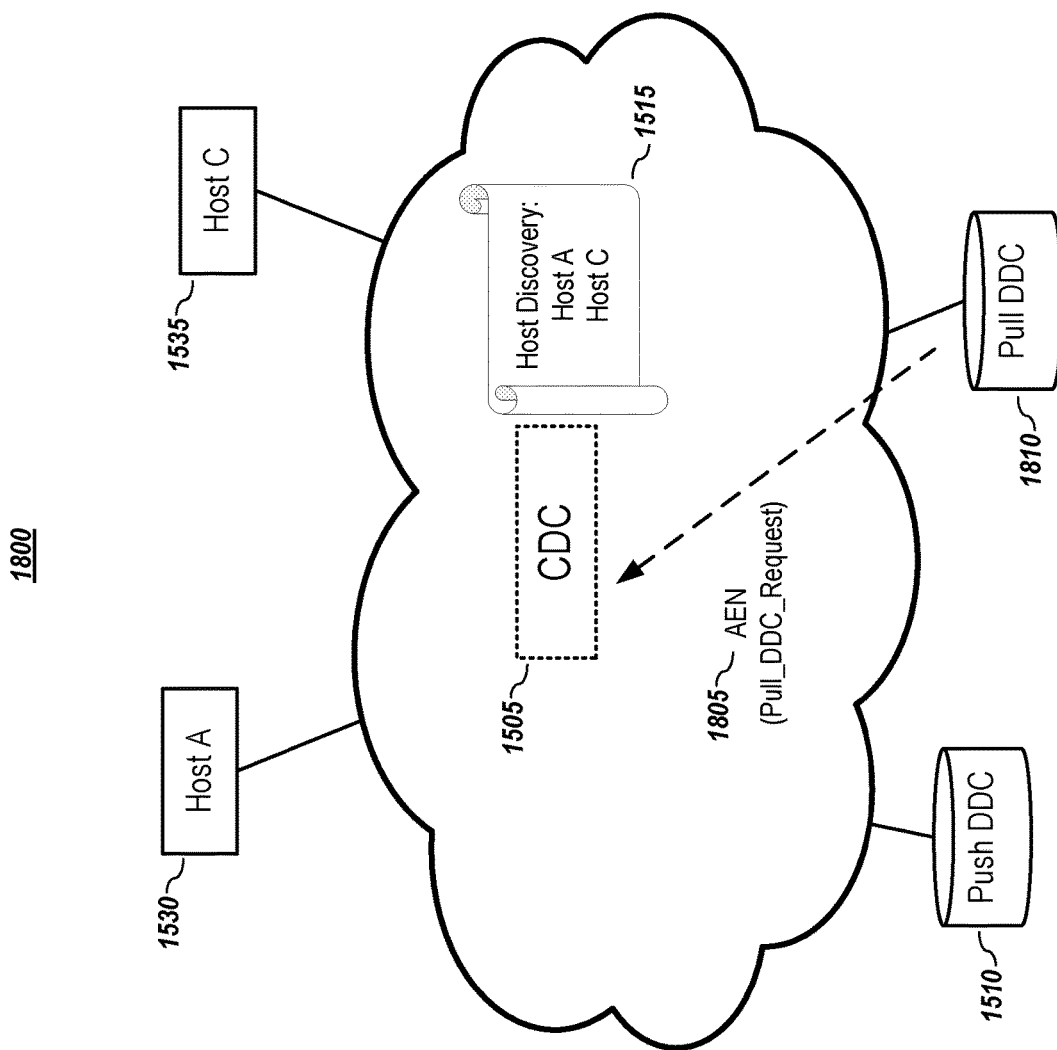
FIGS. 18-21 graphically depict pull model DDC methodologies from obtain information from a CDC, according to embodiments of the present disclosure.

Push model DDCs have the ability to initiate actions that pull model DDCs cannot. Consider, by way of illustration, the host discovery activities for a push model DDC, which are depicted in FIGS. 15-17. As shown in FIG. 15, a push model DDC 1510 can send a GLP request 1520 for host discovery to a CDC 1505. In the depicted example, two hosts (Host A 1530 and Host C 1535) have registered or been registered 1515 with the CDC 1505. Upon receipt of the GLP 1520, the CDC returns 1525 the host discovery information 1525 as the contents of the Host Discovery Log Page. Thus, a push model DDC can retrieve a Host Discovery Log Page 1525 by directly issuing 1520 a Get Log Page command.

Similarly, if a new host is added, the push model DDC can request the updated host information. Consider, by way of illustration, FIGS. 16 and 17. In FIG. 16, host B 1620 is added to the network and registers or is registered 1615 with the CDC 1505. The CDC notifies 1605 the DDC 1510 via an AEN for a Host Discovery Log Page using a specific Log Page Identifier (LID) (e.g., 71h) to notify the DDC to request the appropriate information. As shown in FIG. 17, the push model DDC 1510 may retrieve the updated Host Discovery Log Page 1725 by issuing another Get Log Page 1720 to the CDC.

The interactions in FIGS. 15-17 are possible given the push nature of the DDC. However, they are not possible for a pull model DDC; but, given a command execution request embodiment as discussed, a pull model DDC may use the command execution request framework for host discovery or to obtain other information from the CDC.

Figure 19:
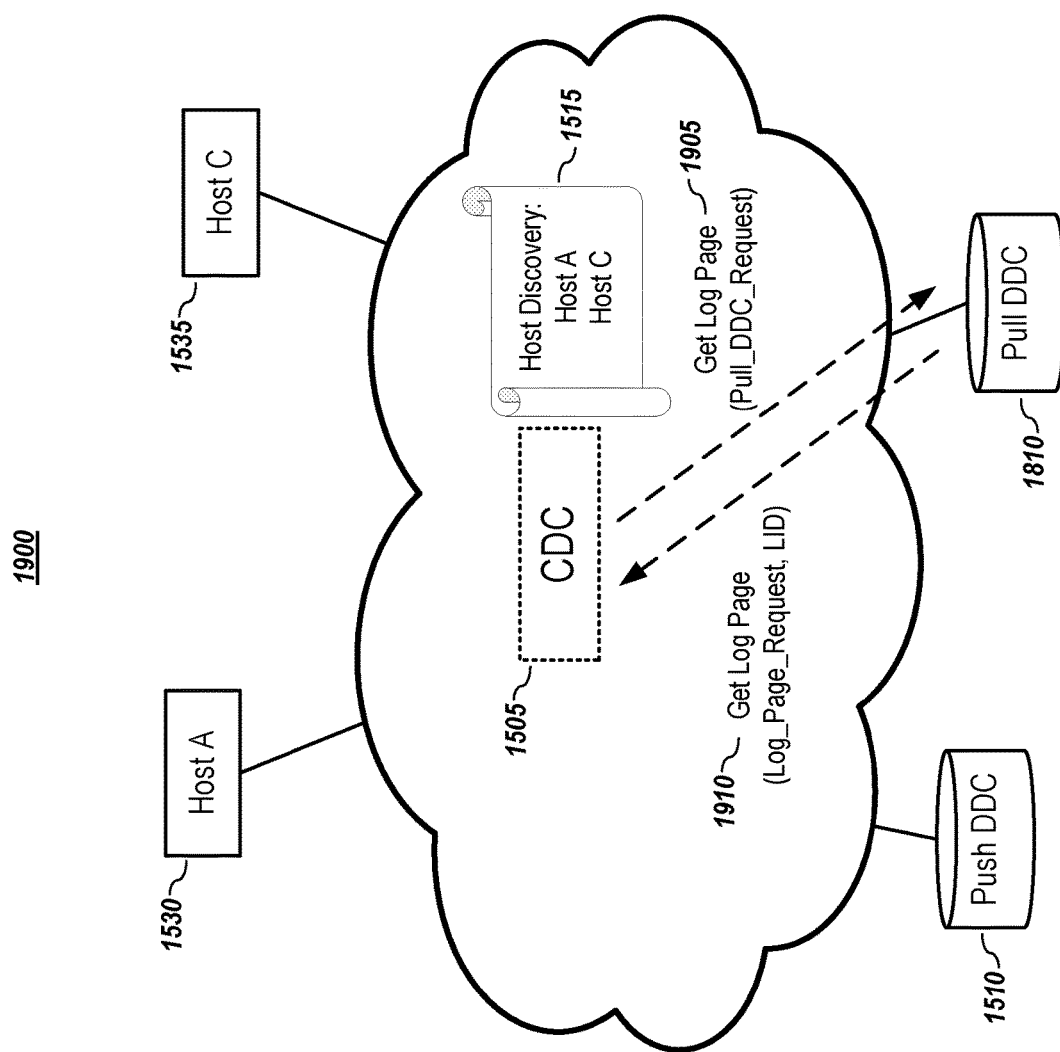
Figure 20:
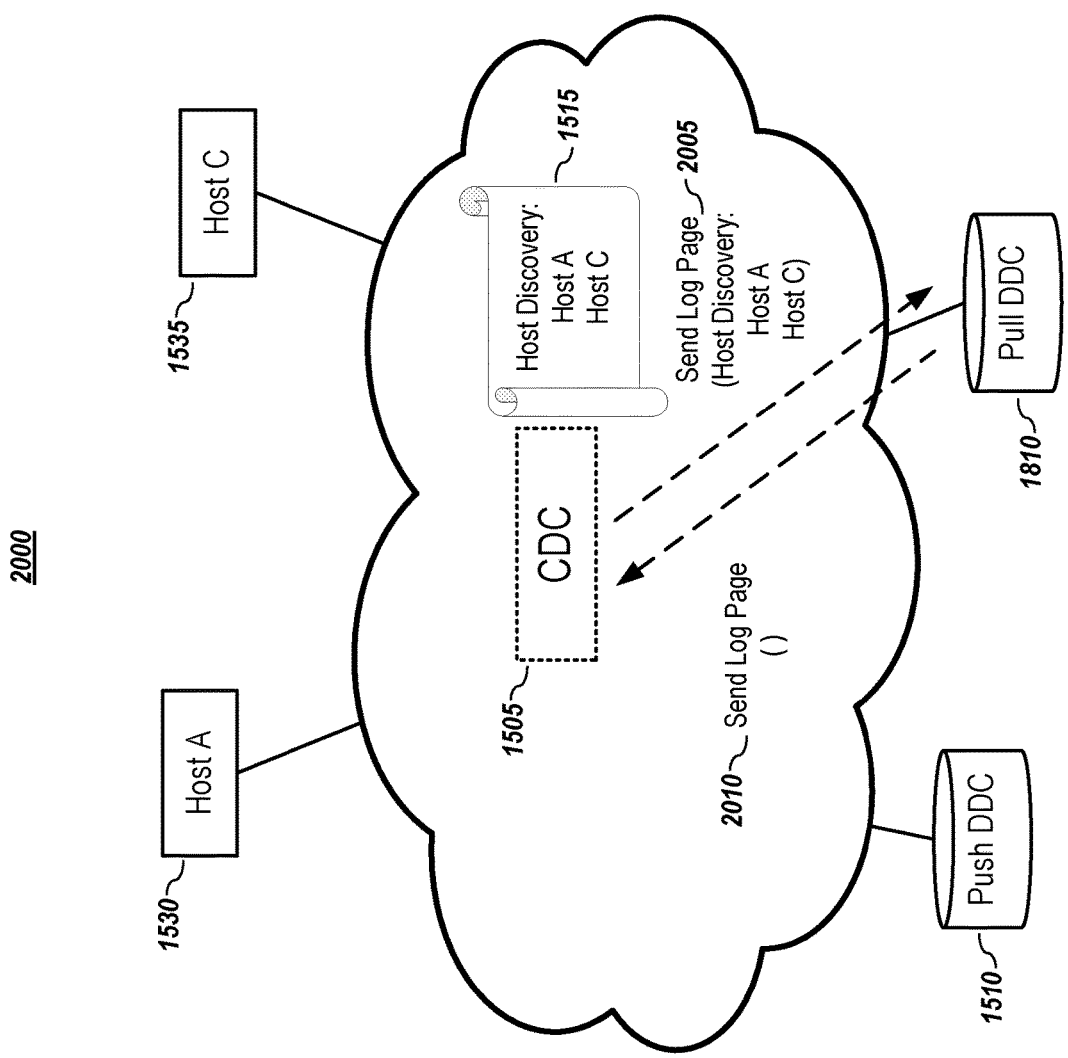

FIGS. 18-21 graphically depict pull model DDC methodologies for obtaining information from a CDC, according to embodiments of the present disclosure. Starting with FIG. 18, a pull model DDC 1810 may initiate the process to retrieve a Host Discovery Log Page by issuing a Pull_DDC_Request AEN 1805 to the CDC 1505. Turning to FIG. 19, the CDC issues (1905) a Get Log Page requesting the Pull_DDC_Request Log Page, and the DDC 1810 replies (1910) with the contents of that Log Page. Said Log Page contents request a Log_Page_Request operation for the Host Discovery Log Page by identifying the operation and the request log page identifier (e.g., LID=71h). In FIG. 20, the CDC 1505 issues (2005) a Send Log Page command carrying the Host Discovery Log Page. The DDC may respond (2010) indicating the status of its receipt of the Send Log Page 2005.

Figure 21:
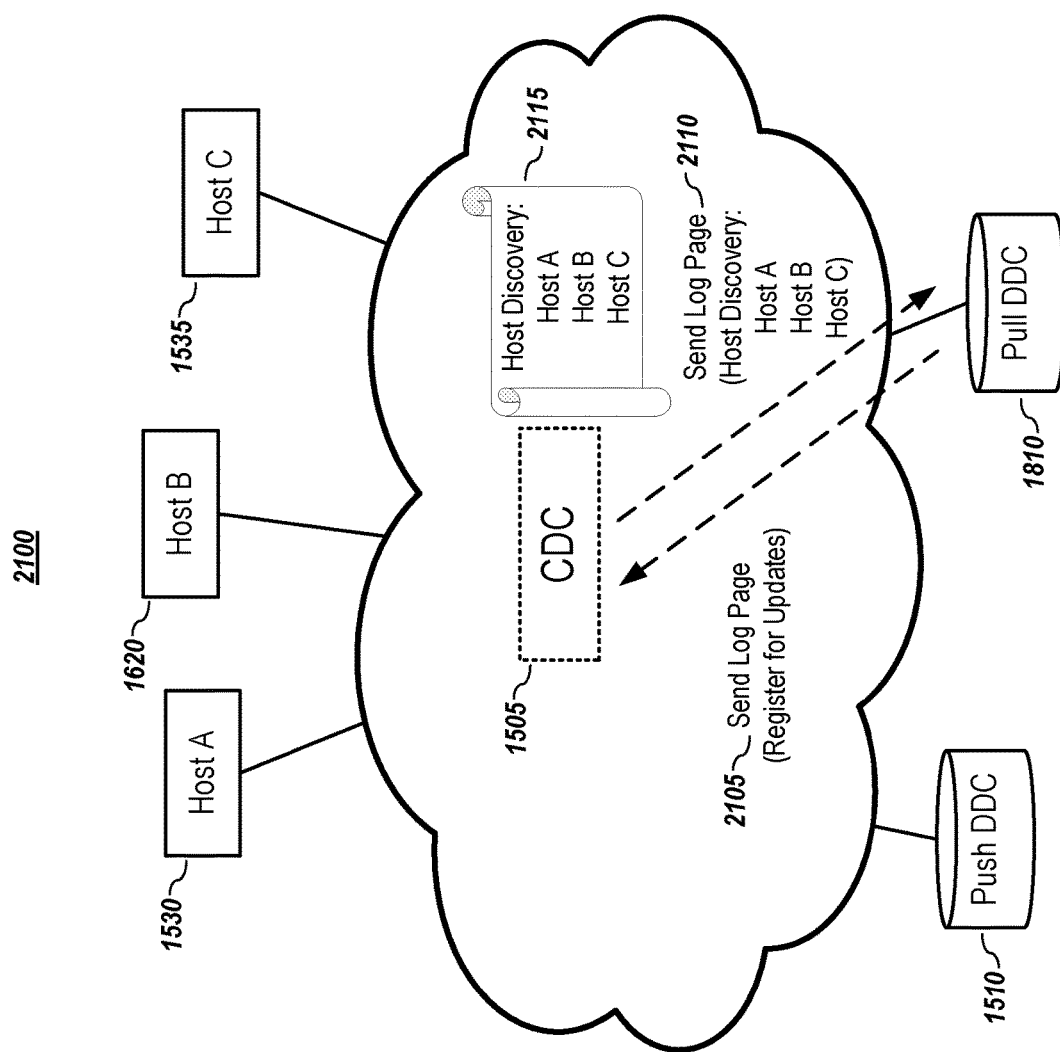

This framework may also be used for updates to host discovery information. A problem in the pull model environment is that the CDC has to issue an unsolicited Send Log Page command carrying the updated Log Page contents. In one or more embodiments, this behavior may be controlled by the pull model DDC through a "Register for Log Page Updates" flag in the Send Log Page CQE. FIG. 21 graphically illustrates such as a process. As depicted, in a Send Log Page communication, the pull DDC 1805 may registered (2105) for updates related to the hosts. When host B 1620 is added, the CDC 1505, knowing that the pull DDC 1805 registered to be informed of updated host information, will send 2110 a Send Log Page with the host discovery information to the pull DDC.

Figure 22:
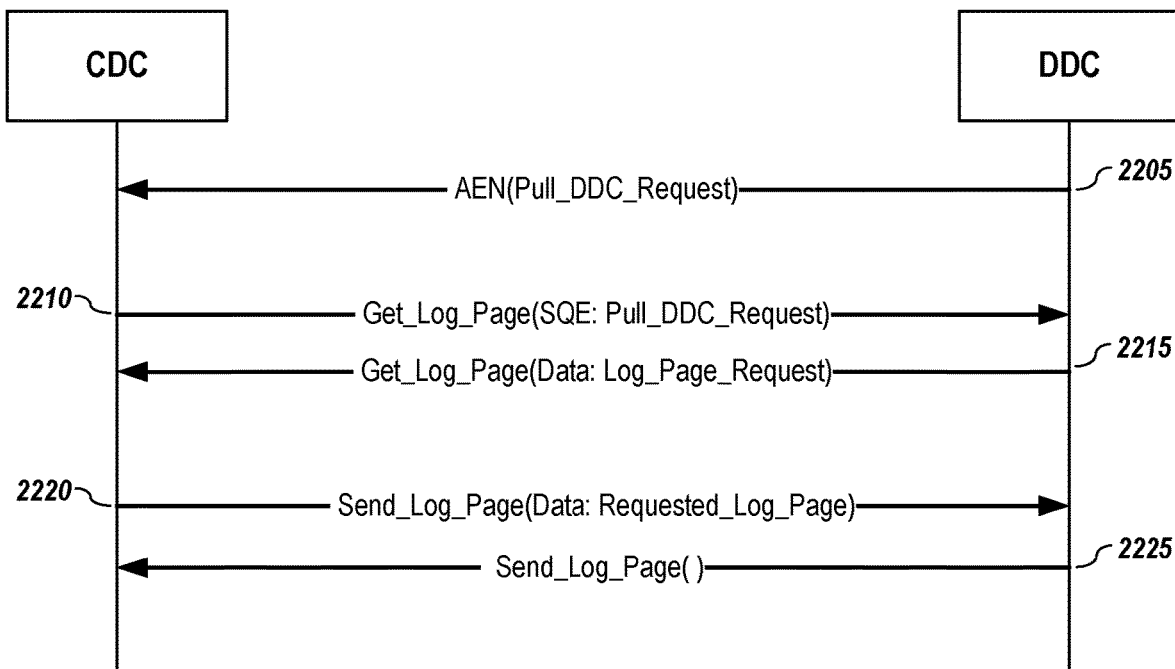
FIG. 22 depicts a general methodology for host discovery for a pull DDC, according to embodiments of the present disclosure.

FIG. 22 depicts a general methodology for host discovery for a pull DDC, according to embodiments of the present disclosure. As depicted, a pull model DDC may request a Host Discovery list through a Pull DDC Request asynchronous event notification (2205). As mentioned above, this AEN includes a notice event to indicate that a pull model DDC is requesting the CDC to perform an operation. In one or more embodiments, the CDC responds (2210) to that AEN with a Get Log Page command requesting a Pull DDC Request Log Page, to which the DDC responds (2215) with a Log Page whose contents request a Log Page Request operation.

In one or more embodiments, the format of the operation specific parameters of a Pull DDC Request Log Page requesting a Log Page Request operation may be as follows:

| Bytes | Description |
| --- | --- |
| 00 | Log Page Request Log Page Identifier (LPRLID) |
| 01 | Log Page Request Log Specific Field (LPRLSP) |
| 03:02 | <reserved> |

In one or more embodiments, the LPRLID and LPRLSP fields may use respectively the same format and semantics of the Log Page Identifier (LID) field (this field specifies the identifier of the log page to retrieve) and Log Specific Field (LSP) field (if not defined for the log specified by the LID field, this field may be reserved) of a Get Log Page command. To retrieve the Host Discovery list, the LPRLID field may be set to a pre-defined value (e.g., 71h).

In one or more embodiments, the Log Page Request operation may be completed by the CDC by issuing a Send Log Page command (2220) to provide the requested Log Page to the pull model DDC.

In one or more embodiments, the transferred Log Page may use the same format of the correspondent Log Page retrieved by a Get Log Page command.

As noted previously, for updates, the pull model DDC receiving the Send Log Page command may request in advance for the CDC to resend the requested Log Page when that Log Page is updated on the CDC. In one or more embodiments, this update may be requested by setting a bit (e.g., bit 31) of the Send Log Page CQE (2225) to indicate Log Page Update Registration (LPUR). That is, this bit specifies whether the CDC should resend the requested Log Page when that Log Page is updated on the CDC. If the bit is set to a first value (e.g., "1"), the CDC issues to the requesting pull model DDC a Send Log Page command carrying the requested Log Page when that Log Page is updated on the CDC. If the bit is set to a second value (e.g., "0"), the CDC does not issue a Send Log Page command carrying the requested Log Page when that Log Page is updated on the CDC.

Figure 23:
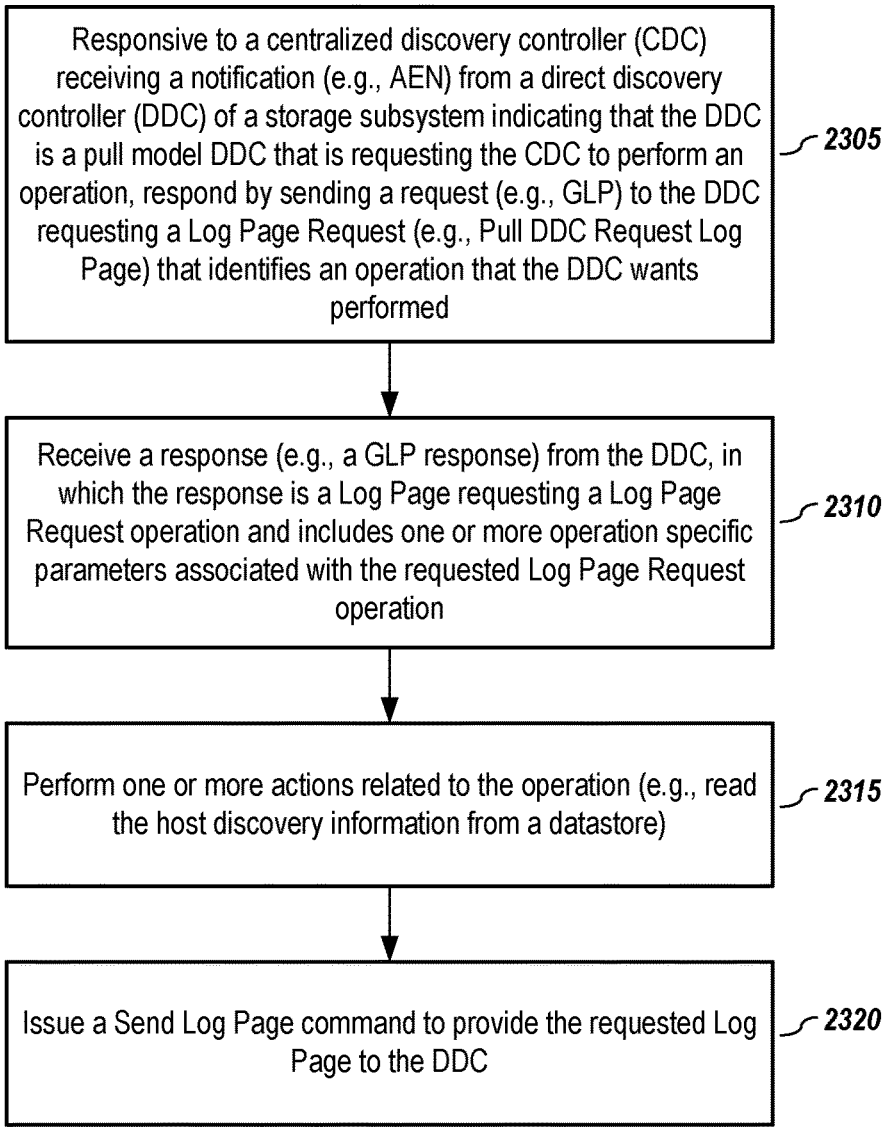
FIG. 23 depicts an alternative methodology of CDC functions for host discovery in a pull model environment, according to embodiments of the present disclosure.

FIG. 23 depicts an alternative methodology of CDC functions for host discovery in a pull model environment, according to embodiments of the present disclosure. In one or more embodiments, responsive to the CDC receiving a notification (e.g., AEN) from a DDC of a storage subsystem indicating that a pull model DDC is requesting the CDC to perform an operation, the CDC responds (2305) by sending a request (e.g., GLP) to the DDC requesting a Log Page Request (e.g., Pull DDC Request Log Page) that identifies an operation that the DDC wants performed. It should be noted that not depicted in FIG. 23, the CDC may previously have sent an Asynchronous Event Request (AER) command to receive a notice from the DDC. The CDC receives (2310) a response (e.g., a GLP response) from the DDC, in which the response is a Log Page requesting a Log Page Request operation and includes one or more operation specific parameters associated with the requested Log Page Request operation. The CDC performs (2315) one or more actions related to the operation (e.g., read the host discovery information from a datastore) and issues (2320) a Send Log Page command to provide the requested Log Page to the DDC.

Figure 24:
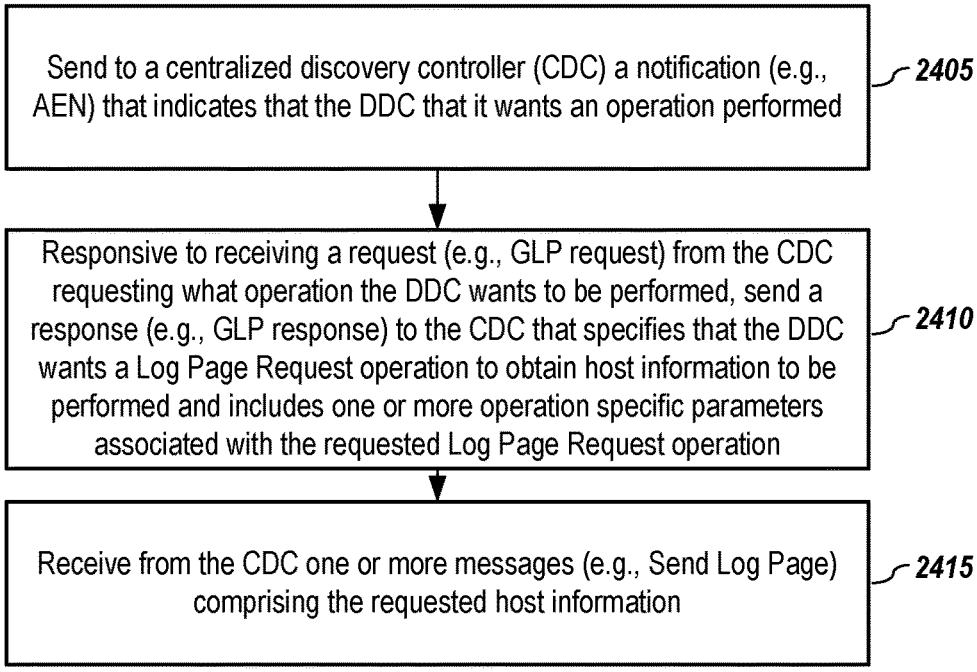
FIG. 24 depicts an alternative methodology of DDC functions for host discovery in a pull model environment, according to embodiments of the present disclosure.

FIG. 24 depicts an alternative methodology of DDC functions for host discovery in a pull model environment, according to embodiments of the present disclosure. In one or more embodiments, the DDC sends (2405) a notification (e.g., AEN) to a CDC that indicates that the DDC wants an operation performed. Responsive to receiving a request (e.g., GLP request) from the CDC requesting what operation the DDC wants performed, the DDC sends (2410) a response (e.g., GLP response) to the CDC that specifies that the DDC wants a Log Page Request operation to obtain host information to be performed and includes one or more operation specific parameters associated with the requested Log Page Request operation. The CDC obtains the requested host discovery information, and the DDC receives (2415) from the CDC one or more responses (e.g., Send Log Page commands(s)) comprising the requested host information. While not depicted, in FIG. 24, in responding to the Send Log Page, the DDC may indicate to the CDC that the DDC wants updates sent to it if information changes.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 25:
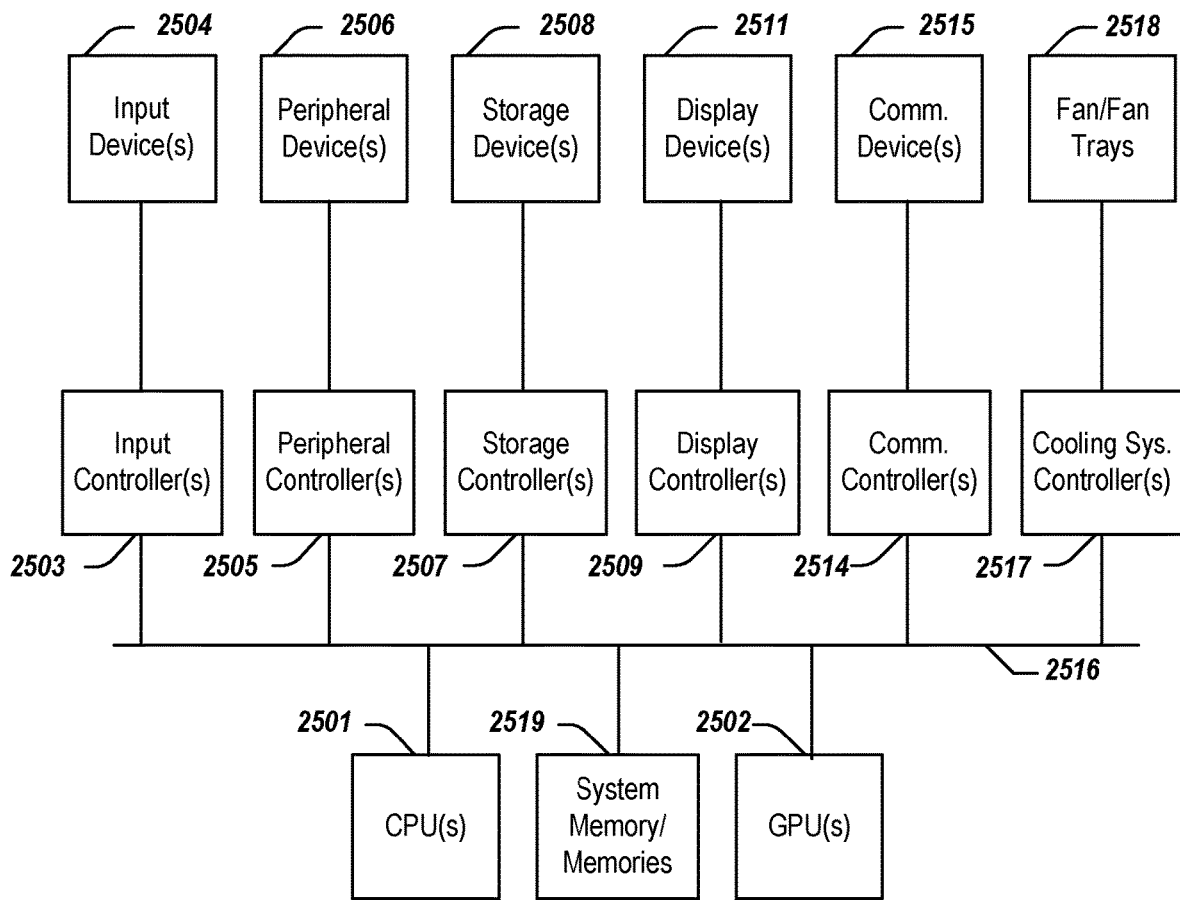
FIG. 25 depicts a simplified block diagram of an information handling system, according to embodiments of the present disclosure.

FIG. 25 depicts a simplified block diagram of an information handling system (or computing system), according to embodiments of the present disclosure. It will be understood that the functionalities shown for system 2500 may operate to support various embodiments of a computing system—although it shall be understood that a computing system may be differently configured and include different components, including having fewer or more components as depicted in FIG. 25.

As depicted, computing system 2500 includes one or more CPUs 2501 that provides computing resources and controls the computer. CPU 2501 may be implemented with a microprocessor or the like and may also include one or more graphics processing units (GPU) 2502 and/or a floating-point coprocessor for mathematical computations. In one or more embodiments, one or more GPUs 2502 may be incorporated within the display controller 2509, such as part of a graphics card or cards. The system 2500 may also include a system memory 2519, which may comprise RAM, ROM, or both.

A number of controllers and peripheral devices may also be provided, as shown in FIG. 25. An input controller 2503 represents an interface to various input device(s) 2504, such as a keyboard, mouse, touchscreen, stylus, microphone, camera, trackpad, display, etc. The computing system 2500 may also include a storage controller 2507 for interfacing with one or more storage devices 2508 each of which includes a storage medium such as magnetic tape or disk, or an optical medium that might be used to record programs of instructions for operating systems, utilities, and applications, which may include embodiments of programs that implement various aspects of the present disclosure. Storage device(s) 2508 may also be used to store processed data or data to be processed in accordance with the disclosure. The system 2500 may also include a display controller 2509 for providing an interface to a display device 2515, which may be a cathode ray tube (CRT) display, a thin film transistor (TFT) display, organic light-emitting diode, electroluminescent panel, plasma panel, or any other type of display. The computing system 2500 may also include one or more peripheral controllers or interfaces 2505 for one or more peripherals 2506. Examples of peripherals may include one or more printers, scanners, input devices, output devices, sensors, and the like. A communications controller 2514 may interface with one or more communication devices 2515, which enables the system 2500 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2500 comprises one or more fans or fan trays 2518 and a cooling subsystem controller or controllers 2517 that monitors thermal temperature(s) of the system 2500 (or components thereof) and operates the fans/fan trays 2518 to help regulate the temperature.

In the illustrated system, all major system components may connect to a bus 2516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other NVM devices (such as 3D XPoint-based devices), and ROM and RAM devices.

Figure 26:
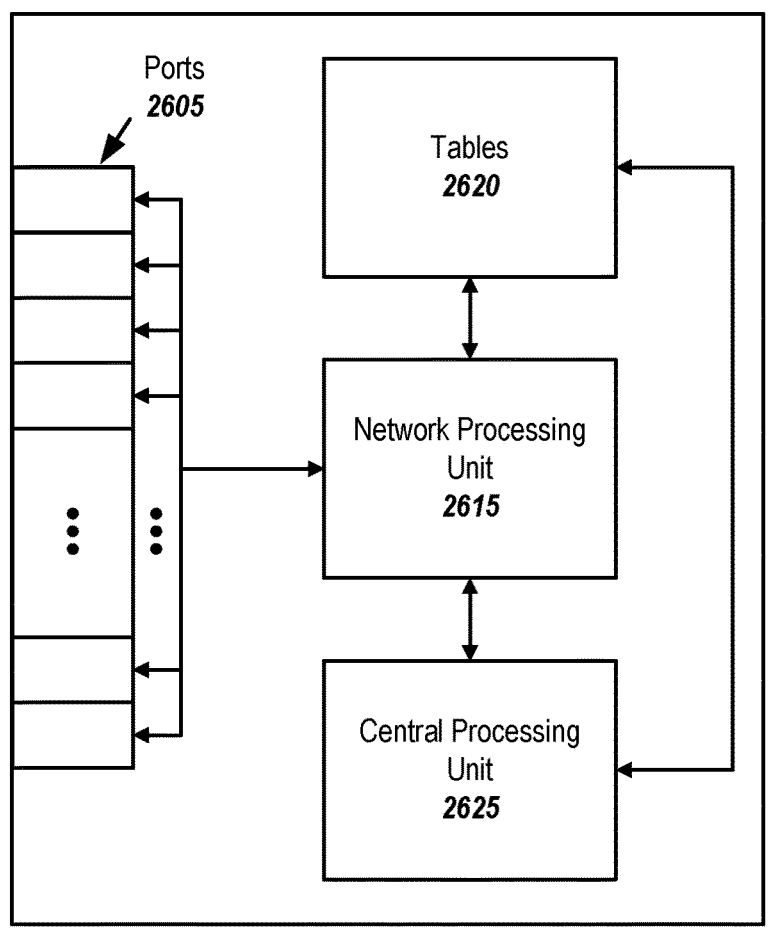
FIG. 26 depicts an alternative block diagram of an information handling system, according to embodiments of the present disclosure.

FIG. 26 depicts an alternative block diagram of an information handling system, according to embodiments of the present disclosure. It will be understood that the functionalities shown for system 2600 may operate to support various embodiments of the present disclosure—although it shall be understood that such system may be differently configured and include different components, additional components, or fewer components.

The information handling system 2600 may include a plurality of I/O ports 2605, a network processing unit (NPU) 2615, one or more tables 2620, and a CPU 2625. The system includes a power supply (not shown) and may also include other components, which are not shown for sake of simplicity.

In one or more embodiments, the I/O ports 2605 may be connected via one or more cables to one or more other network devices or clients. The network processing unit 2615 may use information included in the network data received at the node 2600, as well as information stored in the tables 2620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for using discovery log entry identifiers (DLEIDs) in a Non-Volatile Memory Express™-over Fabrics (NVMe-oF™) environment, the method comprising:
   in response to receiving from a querying device an asynchronous event request (AER) that indicates a request for a differential asynchronous event notification (AEN), communicating the differential AEN to the querying device;
   receiving from the querying device a discovery log request that indicates a request for a list of identifiers that each is associated with a change involving at least one of a set of entries, a set of end devices, or a set of interfaces that the querying device registered with a centralized discovery controller (CDC);
   in response to communicating the list of identifiers to the querying device, receiving an identifier from the list; and
   communicating discovery information associated with the identifier to the querying device, thereby, reducing an amount of discovery information to be processed by the querying device.

2. The computer-implemented method of claim 1 wherein the CDC generates the list of identifiers based on changes in a fabric system and communicates the list together with information about a type of the change.

3. The computer-implemented method of claim 2 wherein the CDC communicates the differential AEN to the querying device after accumulating two or more changes.

4. The computer-implemented method of claim 1 wherein the CDC, in response to communicating the discovery information, clears the list of identifiers, the list having been communicated in a log page response in response to the request that has been communicated in a log page command that comprises a DLEID brief bit.

5. The computer-implemented method of claim 1 wherein the discovery information is communicated in a host discovery log page.

6. The computer-implemented method of claim 5 wherein the host discovery log page comprises a list of changes associated with one or more hosts.

7. A computer-implemented method for using discovery log page identifiers (DLEIDs) in a Non-Volatile Memory Express™-over Fabrics (NVMe-oF™) environment, the method comprising:
   receiving from a querying device a discovery log request that comprises an identifier that identifies at least one of a set of entries, a set of end devices, or a set of interfaces that the querying device registered with a centralized discovery controller (CDC) and that experienced a change in a fabric system; and
   in response to receiving the discovery log request, communicating to the querying device discovery information associated with the identifier, thereby, reducing an amount of discovery information to be processed by the querying device.

8. The computer-implemented method of claim 7 further comprising, the querying device, in response to the change comprising at least one of an entry, an end device, or an interface that has been deleted, removing a log page.

9. The computer-implemented method of claim 7 further comprising, the querying device communicating the discovery log request to the CDC in response to the change comprising at least one of an entry, an end device, or an interface that has been added or updated.

10. The computer-implemented method of claim 7 further comprising, in response to receiving from the querying device an asynchronous event request (AER) that indicates a request for a differential asynchronous event notification (AEN), communicating the differential AEN to the querying device.

11. A computer-implemented method for using discovery log entry identifiers (DLEIDs) in communications between a Non-Volatile Memory Express® (NVMe®) host, a centralized discovery controller (CDC), and a direct discovery controller (DDC) in a Non-Volatile Memory Express™-over Fabrics (NVMe-oF™) environment, the method comprising:
   in a host list pre-loading process, communicating a host discovery list to the DDC;
   in response to receiving from the DDC zoning data, communicating to a host a discovery log page entry (DLPE) for each zone member;
   in response to a new host registering with the CDC, updating the host discovery list;
   in response to receiving from the DDC a DLEID brief bit in a first response, communicating the updated host discovery page to the DDC; and
   in response to the DDC detecting a new entry for the host in its database and sending a second response to a second request, sending to the DDC a discovery log page that comprises detailed information regarding the new entry.

12. The computer-implemented method of claim 11 wherein performing the host list pre-loading process comprises, in response to establishing an explicit persistent connection with the DDC by using a pull registration, sending to the DDC an asynchronous event request (AER) to trigger an asynchronous event notification (AEN) that causes the CDC to send a third request that inquires about a command that the CDC should execute to communicate the host discovery list to the DDC.

13. The computer-implemented method of claim 12 wherein performing the host list pre-loading process further comprises, in response to receiving a counter value and a third response that comprises the command, performing steps comprising:
   executing the command to communicate the host discovery list to the DDC;
   updating the counter value; and
   receiving a confirmation that the counter value has been updated.

14. The computer-implemented method of claim 11 further comprising, in response to receiving the zoning data, sending a second AEN to the host to cause the host to send a get log page request for a list of the DLPEs.

15. The computer-implemented method of claim 11 further comprising, in response to storage being provisioned for the new host and receiving from the DDC a third AEN, sending a fourth request that inquires about a command that the CDC should execute to communicate the host discovery list to the DDC.

16. The computer-implemented method of claim 13 further comprising generating a differential log page that indicates a change since the counter value was last updated.

17. The computer-implemented method of claim 16 further comprising, receiving form the DDC a completion queue entry that confirms the updated counter value.

18. The computer-implemented method of claim 16 further comprising, in response to receiving the confirmation, clearing a differential host list.

19. The computer-implemented method of claim 16 further comprising, in response to the host being at least one of removed from the NVMe-oF™ environment or deregistered from the CDC, updating the differential log page.

20. The computer-implemented method of claim 19 wherein the discovery log page indicates that the host is being at least one of removed or deregistered.

* * * * *